US011199117B2

(12) United States Patent
Sung et al.

(10) Patent No.: US 11,199,117 B2
(45) Date of Patent: Dec. 14, 2021

(54) INTEGRATED EMISSIONS CONTROL SYSTEM

(71) Applicant: BASF CORPORATION, Florham Park, NJ (US)

(72) Inventors: Shiang Sung, New York, NY (US); Torsten Neubauer, Langenhagen (DE); Pushkaraj Patwardhan, Morganville, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/591,822

(22) Filed: Oct. 3, 2019

(65) Prior Publication Data

US 2020/0032686 A1 Jan. 30, 2020

Related U.S. Application Data

(63) Continuation of application No. PCT/IB2018/052306, filed on Apr. 3, 2018.
(Continued)

(51) Int. Cl.
*F01N 3/035* (2006.01)
*F01N 3/08* (2006.01)
*F01N 3/20* (2006.01)
*F01N 3/28* (2006.01)
*F01N 3/022* (2006.01)
*F01N 3/10* (2006.01)
*B01D 53/94* (2006.01)
*B01D 46/00* (2006.01)
*B01D 46/24* (2006.01)
*B01J 35/04* (2006.01)
(Continued)

(52) U.S. Cl.
CPC ......... *F01N 3/035* (2013.01); *B01D 46/0036* (2013.01); *B01D 46/2429* (2013.01); *B01D 53/945* (2013.01); *B01D 53/9418* (2013.01); *B01J 21/04* (2013.01); *B01J 23/58* (2013.01); *B01J 29/763* (2013.01); *B01J 29/7815* (2013.01); *B01J 35/0006* (2013.01); *B01J 35/04* (2013.01); *B01J 37/0219* (2013.01); *B01J 37/0228* (2013.01); *B01J 37/0236* (2013.01); *B01J 37/0244* (2013.01); *B01J 37/086* (2013.01); *F01N 3/0222* (2013.01); *F01N 3/0835* (2013.01); *F01N 3/101* (2013.01); *F01N 3/2066* (2013.01); *F01N 3/2828* (2013.01); *B01D 53/9486* (2013.01); *B01D 2255/1021* (2013.01); *B01D 2255/1023* (2013.01); *B01D 2255/20761* (2013.01); *B01D 2279/30* (2013.01); *F01N 2330/06* (2013.01); *F01N 2330/30* (2013.01); *F01N 2370/04* (2013.01); *F01N 2510/063* (2013.01); *F01N 2510/0684* (2013.01); *F01N 2610/02* (2013.01); *F01N 2610/04* (2013.01)

(58) Field of Classification Search
CPC ...... F01N 3/035; F01N 3/0807; F01N 3/0814; F01N 3/0821; F01N 3/103; F01N 3/2066; F01N 2240/18; F01N 2240/02; F01N 2250/12; F01N 2250/14; F01N 2340/00; F01N 2570/14; F01N 2610/04; F01N 2610/02; B01D 46/00; B01D 46/0027; B01D 46/0036; B01D 46/0038; B01D 46/2418; B01D 53/94; B01D 53/9431; B01D 53/9472
See application file for complete search history.

(56) References Cited

U.S. PATENT DOCUMENTS

| 3,030,181 A | 4/1962 | Milton |
| 4,440,871 A | 4/1984 | Lok et al. |

(Continued)

FOREIGN PATENT DOCUMENTS

| CN | 101365527 A | 2/2009 |
| CN | 102355951 A | 2/2012 |

(Continued)

OTHER PUBLICATIONS

"Ammonia for Fuel Update," New Energy and Fuel, Blog entry published Oct. 18, 2011; available online at https://newenergyandfuel.com/http:/newenergyandfuel/com/2011/10/18/ammonia-for-fuel/. (Year: 2011).*

(Continued)

Primary Examiner — Timothy C Vanoy
(74) Attorney, Agent, or Firm — Finnegan, Henderson, Farabow, Garrett & Dunner LLP

(57) ABSTRACT

The disclosure provides a monolithic wall-flow filter catalytic article including a substrate having an aspect ratio of from about 1 to about 20, and having a functional coating composition disposed on the substrate, the functional coating composition including a first sorbent composition, an oxidation catalyst composition, and optionally, a second sorbent composition. The monolithic wall-flow filter catalytic article may be in a close-coupled position close to the engine. The disclosure further provides an integrated exhaust gas treatment system including the monolithic wall-flow filter catalytic article and may additionally include a flow-through monolith catalytic article. The flow-through monolith catalytic article includes a substrate having a selective catalytic reduction (SCR) coating composition disposed thereon. The integrated exhaust gas treatment system simplifies the traditional four-article system into a two-article Catalyzed Soot Filter (CSF) plus Selective Catalytic Reduction (SCR) CSF+SCR arrangement.

30 Claims, 8 Drawing Sheets

Related U.S. Application Data

(60) Provisional application No. 62/481,225, filed on Apr. 4, 2017.

(51) Int. Cl.
*B01J 23/58* (2006.01)
*B01J 29/78* (2006.01)
*B01J 29/76* (2006.01)
*B01J 21/04* (2006.01)
*B01J 35/00* (2006.01)
*B01J 37/02* (2006.01)
*B01J 37/08* (2006.01)

(56) References Cited

U.S. PATENT DOCUMENTS

| | | | |
|---|---|---|---|
| 4,544,538 A | 10/1985 | Zones et al. | |
| 6,162,415 A | 12/2000 | Liu et al. | |
| 6,171,556 B1 | 1/2001 | Burk et al. | |
| 6,193,929 B1 | 2/2001 | Ovshinsky et al. | |
| 6,709,644 B2 | 3/2004 | Zones et al. | |
| 7,229,597 B2 | 6/2007 | Patchett et al. | |
| 7,264,789 B1 | 9/2007 | Verduijn et al. | |
| 7,704,475 B2 | 4/2010 | Bull et al. | |
| 7,998,423 B2 | 8/2011 | Boorse et al. | |
| 8,119,075 B2 | 2/2012 | Dettling et al. | |
| 8,329,607 B2 | 12/2012 | Kazi et al. | |
| 8,404,203 B2 | 3/2013 | Ludwigshafen et al. | |
| 8,475,722 B2 | 7/2013 | Nakanishi et al. | |
| 8,555,617 B2 | 10/2013 | Mital | |
| 9,011,807 B2 | 4/2015 | Mohanan et al. | |
| 9,017,626 B2 | 4/2015 | Tang et al. | |
| 9,242,238 B2 | 1/2016 | Mohanan et al. | |
| 9,321,008 B2 | 4/2016 | Han et al. | |
| 9,321,042 B2 | 4/2016 | Hoke et al. | |
| 9,352,307 B2 | 5/2016 | Stiebels et al. | |
| 9,517,456 B2 | 12/2016 | Patchett et al. | |
| 9,757,717 B2 | 9/2017 | Patchett et al. | |
| 10,364,723 B2 | 7/2019 | Raux | |
| 2001/0049339 A1 | 12/2001 | Schafer-Sindlinger et al. | |
| 2002/0002905 A1 | 1/2002 | Umino et al. | |
| 2002/0166546 A1 | 11/2002 | Andrews et al. | |
| 2004/0241507 A1 | 12/2004 | Schubert et al. | |
| 2007/0116870 A1 | 5/2007 | Detting et al. | |
| 2007/0246351 A1 | 10/2007 | Smola et al. | |
| 2007/0274892 A1* | 11/2007 | Duvinage | F01N 3/2006 423/239.2 |
| 2008/0003470 A1 | 1/2008 | Christenson et al. | |
| 2008/0196588 A1 | 8/2008 | Gretta et al. | |
| 2008/0233345 A1 | 9/2008 | Allen | |
| 2008/0257751 A1 | 10/2008 | Smola et al. | |
| 2008/0274873 A1 | 11/2008 | Schubert | |
| 2009/0107116 A1 | 4/2009 | Barber et al. | |
| 2009/0263296 A1 | 10/2009 | Taques | |
| 2009/0285740 A1 | 11/2009 | Sobolevskiy et al. | |
| 2010/0024403 A1 | 2/2010 | Johannessen et al. | |
| 2010/0024542 A1 | 2/2010 | Yen et al. | |
| 2010/0186375 A1* | 7/2010 | Kazi | B01J 35/1061 60/274 |
| 2010/0251700 A1 | 10/2010 | Wan et al. | |
| 2011/0008694 A1 | 1/2011 | Tange et al. | |
| 2011/0236790 A1 | 9/2011 | Schubert | |
| 2013/0047584 A1 | 2/2013 | Park | |
| 2014/0363358 A1 | 12/2014 | Udd et al. | |
| 2015/0375221 A1 | 12/2015 | Bergeal et al. | |
| 2016/0136626 A1 | 5/2016 | Phillips et al. | |
| 2016/0230255 A1 | 8/2016 | Young et al. | |
| 2016/0298514 A1 | 10/2016 | Raux et al. | |
| 2016/0310897 A1 | 10/2016 | Tsuji et al. | |
| 2016/0340182 A1 | 11/2016 | Hosono et al. | |
| 2016/0348556 A1 | 12/2016 | Suyama | |
| 2017/0175607 A1* | 6/2017 | De Smet | F01N 3/2066 |
| 2017/0216770 A1* | 8/2017 | Chiffey | B01J 35/04 |
| 2017/0276053 A1* | 9/2017 | Robel | B01D 53/9477 |
| 2019/0001268 A1* | 1/2019 | Chen | B01D 53/9418 |
| 2019/0162091 A1* | 5/2019 | Banno | B01D 53/90 |
| 2019/0232225 A1* | 8/2019 | Nishimura | B01D 53/9459 |
| 2019/0242282 A1* | 8/2019 | Li | F01N 3/106 |

FOREIGN PATENT DOCUMENTS

| | | |
|---|---|---|
| CN | 105917090 A | 8/2016 |
| DE | 4103668 | 8/1992 |
| EP | 0640378 | 3/1995 |
| EP | 2230001 | 9/2010 |
| FR | 2941499 | 7/2011 |
| GB | 868846 | 5/1961 |
| JP | H06146873 | 5/1994 |
| JP | 2006136776 | 6/2006 |
| JP | 2010203335 | 6/2006 |
| JP | 2010203335 | 9/2010 |
| KR | 970070445 | 11/1997 |
| KR | 20050115420 | 12/2005 |
| KR | 20100098143 | 9/2010 |
| KR | 101076841 | 10/2011 |
| KR | 101553587 | 9/2015 |
| WO | WO2014073576 | 5/2014 |
| WO | WO2015145181 | 10/2015 |
| WO | WO2016034401 | 3/2016 |
| WO | WO 2016/070090 | 6/2016 |
| WO | WO 2016/138418 | 9/2016 |
| WO | WO2016138418 | 9/2016 |
| WO | WO 2016/168106 A1 | 10/2016 |
| WO | WO 2017/019958 | 2/2017 |
| WO | WO2018185661 | 10/2018 |

OTHER PUBLICATIONS

Alfred K. Hill, Laura Torrente-Murciano; "Low temperature $H_2$ production from ammonia using ruthenium-based catalysts: Synergetic effect of promoter and support," Applied Catalysis B: Environmental 172-173 (2015) 129-135.

N. Itoh, A. Oshima, E. Suga, T. Sato;"Kinetic enhancement of ammonia decomposition as a chemical hydrogen carrier in palladium membrane reactor, " Catalysis Today 236 (2014) 70-76.

William I. F. David, Joshua W. Makepeace, Samantha K. Callear, Hazel M. A. Hunter, James D. Taylor, Thomas J. Wood, Martin O. Jones, J, "Hydrogen production from ammonia using sodium amide,". Am. Chem. Soc. 2014, 136 (38).

Irena Short, Ashok Sahgal, Walter Hayduk, "Solubility of ammonia and hydrogen sulfide in several polar solvents,", J. Chem. Eng. Data 1983, v28(1), 63-66.

"Why on-board hydrogen generators won't boost your mileage," Blog entry published Aug. 4, 2008; available at https://www.autoblog.com/2008/08/04/why-on-board-hydrogen-generators-wont-boost-your-mileage/.

Kim et al."Development on New Catalyst Technology for Compact SCR Modularization for Ship", The Korean Society of Industrial and Engineering Chemistry 2016 Spring Meeting.

Supplementary European Search Report dated Jul. 22, 2020 for European Application No. EP 18 78 1364.

International Search Report dated Jul. 24, 2018 for PCT/IB2018/052306.

Communication Pursuant to Article 94(3) EPC for corresponding EP Application No. 18 781 365.7, dated Mar. 16, 2021 (10 pages).

Office Action from Chinese Patent Office for corresponding CN Application No. 201880036837.8, dated Mar. 17, 2021.

Chinese Office Action in counterpart Chinese Patent Application No. 201880036837.8, dated Sep. 8, 2021 (9 pages).

* cited by examiner

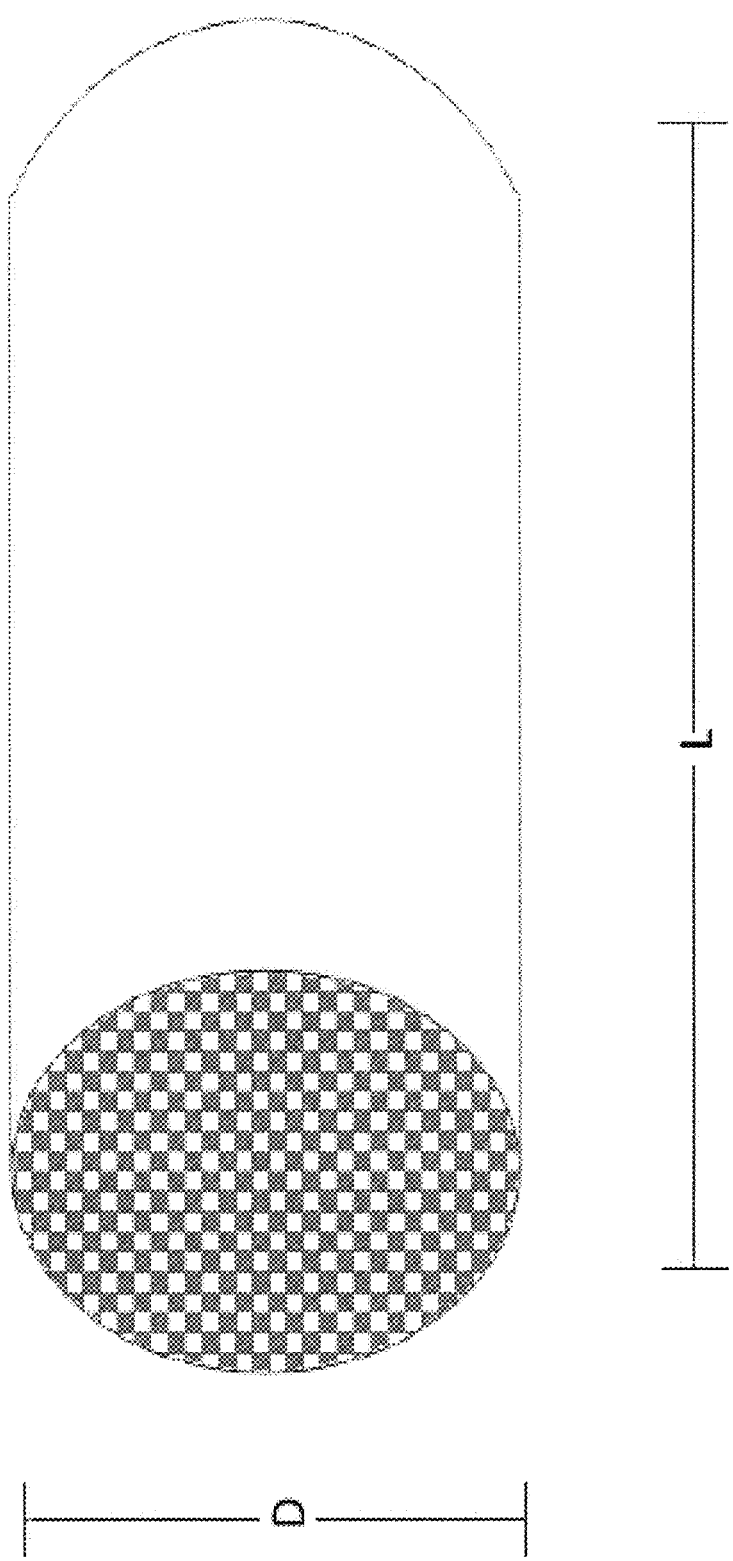

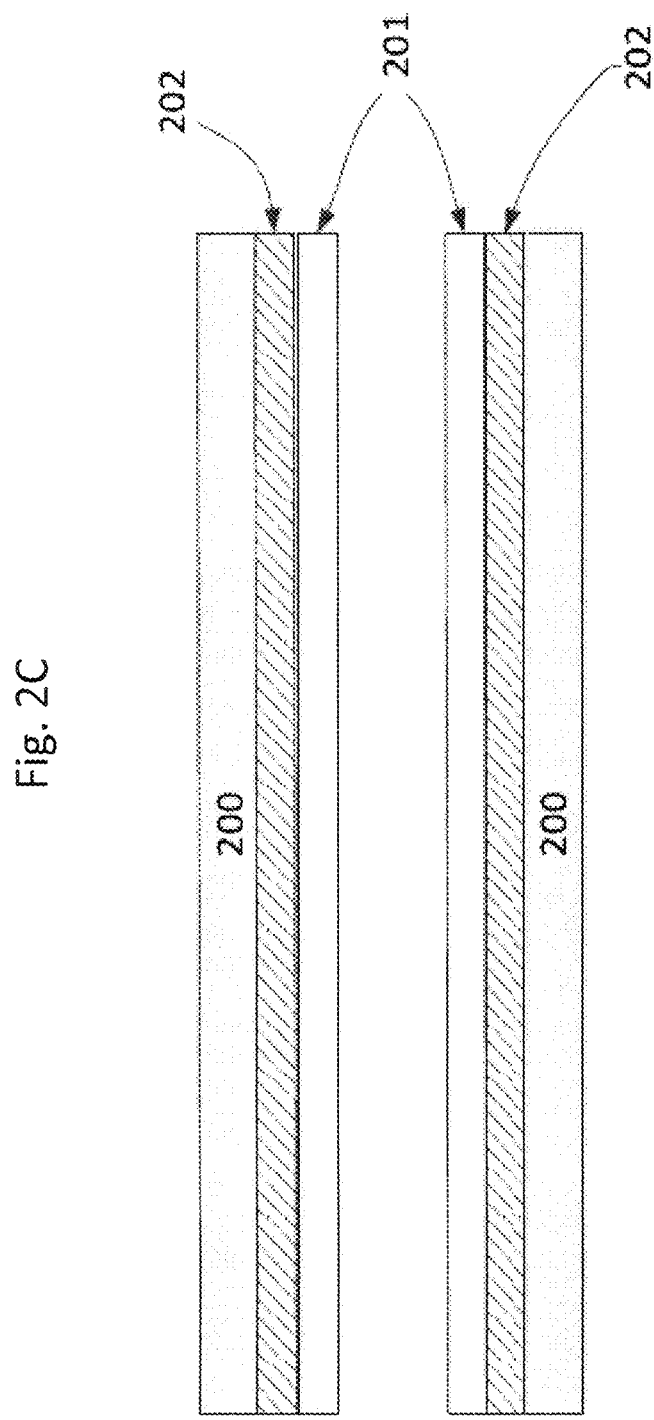

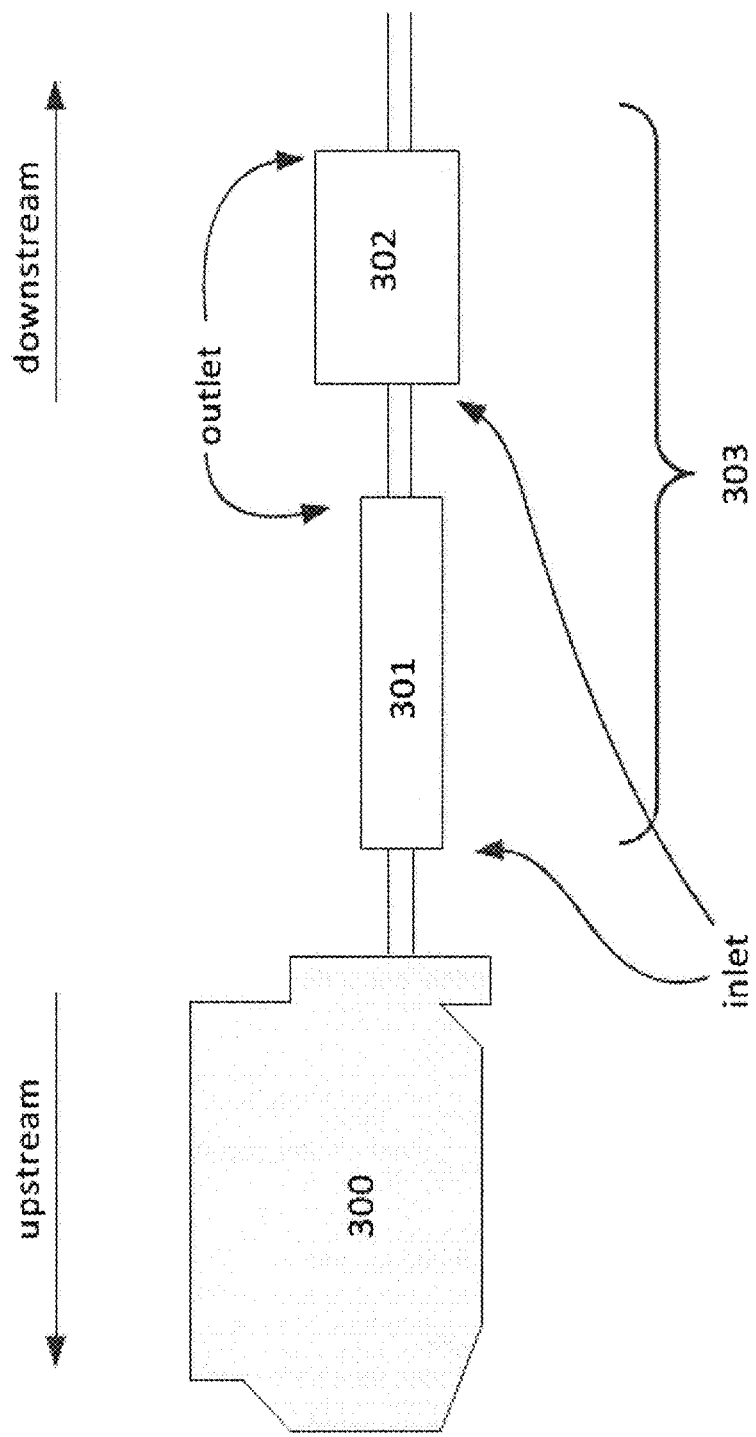

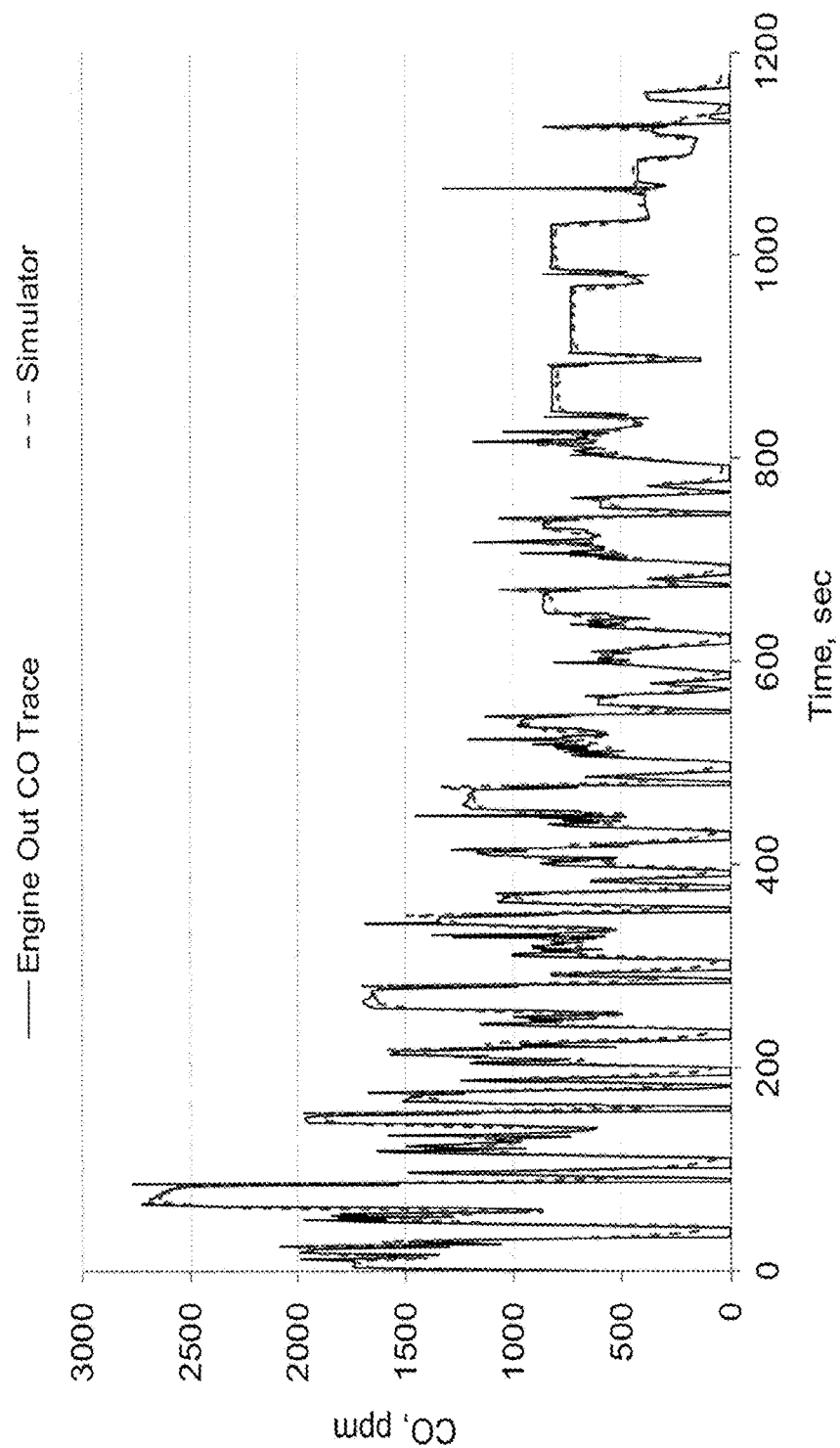

INTEGRATED EMISSIONS CONTROL SYSTEM

CROSS-REFERENCE TO RELATED APPLICATIONS

This application is a continuation of International Application No. PCT/IB2018/052306, filed Apr. 3, 2018, which International Application was published by the International Bureau in English on Oct. 11, 2018, and which claims priority to U.S. Provisional Application No. 62/481,225, filed on Apr. 4, 2017, the content of each of which is hereby incorporated by reference in its entirety.

FIELD OF THE INVENTION

The invention is aimed at a simplified integrated emissions control system.

BACKGROUND OF THE INVENTION

Environmental regulations for emissions of internal combustion engines are becoming increasingly stringent throughout the world. Operation of lean-burn engines, for example diesel engines, provides the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalyst compositions comprising a precious metal, such as platinum group metals (PGM), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalyst compositions have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain PGM promote the oxidation of NO to $NO_2$. Catalysts are typically defined by their light-off temperature or the temperature at which 50% conversion is attained, also called $T_{50}$.

Catalyst compositions used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include a sorbent material, which may be a zeolite, as part of a catalytic treatment system in order to adsorb and/or absorb gaseous pollutants, usually hydrocarbons, and retain them during the initial cold-start period. As the exhaust gas temperature increases, the stored hydrocarbons are driven from the sorbent and subjected to catalytic treatment at the higher temperature.

$NO_x$ is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution. One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or under lean engine operation with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst composition generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr or Ba. Other LNT systems can contain rare earth metal oxides such as oxides of Ce, La, Pr or Nd. The $NO_x$ sorbents can be used in combination with platinum group metal catalyst compositions such as platinum dispersed on an alumina support for catalytic $NO_x$ oxidation and reduction. The LNT catalyst composition operates under cyclic lean (trapping mode) and rich (regeneration mode) exhaust conditions during which the engine out NO is converted to $N_2$.

Another effective method to reduce $NO_x$ from the exhaust of lean-burn engines requires reaction of $NO_x$ under lean burn engine operating conditions with a suitable reductant such as ammonia or hydrocarbon in the presence of a selective catalytic reduction (SCR) catalyst composition. The SCR process uses catalytic reduction of nitrogen oxides with a reductant (e.g., ammonia) in the presence of atmospheric oxygen, resulting in the formation predominantly of nitrogen and steam:

$4NO + 4NH_3 + O_2 \rightarrow 4N_2 + 6H_2O$ (standard SCR reaction)
$2NO_2 + 4NH_3 \rightarrow 3N_2 + 6H_2O$ (slow SCR reaction)
$NO + NO_2 + NH_3 \rightarrow 2N_2 + 3H_2O$ (fast SCR reaction)

Current catalyst compositions employed in the SCR process include molecular sieves, such as zeolites ion-exchanged with a catalytic metal such as iron or copper. Suitable SCR catalyst compositions include metal-containing molecular sieves such as metal-containing zeolites. A useful SCR catalyst composition is able to effectively catalyze the reduction of the $NO_x$ exhaust component at temperatures below 600° C. so that reduced $NO_x$ levels can be achieved even under conditions of low load which typically are associated with lower exhaust temperatures.

Increasingly stringent emissions regulations have driven the need for developing emission gas treatment systems with improved CO, HC and NO oxidation capacity to manage CO, HC and NO emissions at low engine exhaust temperatures. In addition, development of emission gas treatment systems for the reduction of $NO_x$ (NO and $NO_2$) emissions to nitrogen has become increasingly important. This has resulted in more complicated systems to handle every aspect of the driving cycles. One example is a diesel exhaust treatment system having a DOC+CSF+SCR+AMOx system wherein the DOC (diesel oxidation catalyst) will reduce CO/HC emissions and the CSF (catalyzed soot filter) will minimize particulates and further reduce the entrainment of CO/HC. The SCR (selective catalytic reduction) article will reduce $NO_x$ emissions with injections of ammonia. However, an AMOx (ammonia oxidation) catalyst article is needed to minimize the slip of ammonia during the SCR operation.

A CSF is an article generally comprising an oxidation catalyst composition deposited onto a soot filter. The soot filter may be made of any suitable refractory material, e.g., cordierite, cordierite-α alumina, silicon nitride, silicon carbide, aluminum titanite, aluminum carbide, zirconium mullite, spodumene, alumina-silica magnesia, zirconium silicate, sillimanite, magnesium silicates, zirconia, petalite, α-alumina, aluminosilicates and the like, or a combination of any two or more thereof. It may be made of metal, such as aluminum, iron, stainless steel, carbon steel, and the like. The wall-flow filter is defined as a flow-through substrate in which the exhaust gas in different parts of the substrate may communicate through the walls of the passages. One example may be, but not limit to, an Emitec LS/PE substrate.

Exhaust gas treatment systems thus typically require four or five different catalyst/functional articles in certain configurations to achieve the required abatement of CO, HC, NO and particulate matter (PM). Simplified exhaust gas treatment systems, such as those requiring fewer catalytic/functional articles are therefore desired.

SUMMARY OF THE INVENTION

The present invention is aimed at simplified exhaust gas treatment systems and methods for abatement of pollutants in an exhaust gas stream of an internal combustion engine. The disclosure provides compositions, catalytic articles, exhaust gas treatment systems, and methods for oxidation and selective catalytic reduction (SCR) of exhaust gas streams containing $NO_x$ and/or CO and/or HC and/or soot.

Accordingly, in one aspect is provided a monolithic wall-flow filter catalytic article comprising a substrate having an axial length L, a diameter D, and a volume wherein the substrate comprises a front, upstream end and a rear, downstream end defining the axial length, an aspect ratio defined by L/D of from about 1 to about 20; and a functional coating composition disposed on the substrate, the functional coating composition comprising a first sorbent composition, an oxidation catalyst composition, and optionally, a second sorbent composition.

In some embodiments, the first sorbent composition comprises one or more of alkaline earth metal oxides, alkaline earth metal carbonates, rare earth oxides, or molecular sieves. In some embodiments, the first sorbent composition comprises a zeolite selected from the group consisting of faujasite, chabazite, clinoptilolite, mordenite, silicalite, zeolite X, zeolite Y, ultrastable zeolite Y, ZSM-5 zeolite, offretite and beta zeolite.

In some embodiments, the oxidation catalyst composition effectively oxidizes one or more of NO, CO, and HC in an exhaust gas stream at a temperature of less than about 150° C. In some embodiments, the oxidation catalyst composition comprises a platinum group metal (PGM) component dispersed on a refractory metal oxide support. In some embodiments, the second sorbent composition comprises a small pore or medium pore molecular sieve. In some embodiments, the second sorbent composition further comprises a PGM component. In some embodiments, the first sorbent composition, the oxidation catalyst composition, and, optionally, the second sorbent composition are arranged in two or three layers in a zoned configuration.

In some embodiments, the monolithic wall-flow filter catalytic article exhibits an increase in backpressure or a pressure drop, measured as a function of air flow, of ≤25% relative to a monolithic wall-flow filter article of the same substrate and dimensions without the functional coating composition disposed thereon.

In another aspect is provided a vehicle comprising the monolithic wall-flow filter catalytic article as described herein.

In a further aspect is provided an exhaust gas treatment system comprising a monolithic wall-flow filter catalytic article as described herein, wherein the monolithic wall-flow filter catalytic article is located downstream of and in fluid communication with an internal combustion engine; and, a first hydrogen injection article, wherein the first hydrogen injection article is configured to introduce hydrogen upstream of the monolithic wall-flow filter catalytic article.

In some embodiments, the exhaust gas treatment system further comprises a hydrogen storage article, wherein the hydrogen injection article is configured for intermittent introduction of hydrogen stored in the hydrogen storage article. In some embodiments, the exhaust gas treatment system further comprises a flow-through monolith article downstream of and in fluid communication with the monolithic wall-flow filter catalytic article, the flow-through monolith catalytic article comprising a substrate having a selective catalytic reduction (SCR) coating composition disposed thereon, the SCR coating composition comprising a first SCR catalyst composition, comprising a PGM component dispersed on a refractory metal oxide support and a second SCR catalyst composition, comprising a molecular sieve comprising a base metal.

In some embodiments, the first SCR catalyst composition is effective in reducing nitrogen oxides ($NO_x$) at a temperature of <250° C. In some embodiments, the second SCR catalyst composition is effective in reducing $NO_x$ at a temperature of from about 250° C. to about 550° C. In some embodiments, the molecular sieve is an aluminosilicate zeolite having a CHA crystal structure and a silica-to-alumina ratio from about 1 to about 1000. In some embodiments, the SCR coating composition comprises a first SCR coating layer comprising the first SCR catalyst composition; and a second SCR coating layer comprising the second SCR catalyst composition. In some embodiments, the first SCR coating layer and the second SCR coating layer are in a zoned configuration.

In some embodiments, the exhaust gas treatment system further comprises a second hydrogen injection article configured to introduce hydrogen upstream of the flow-through monolith article. In some embodiments, the exhaust gas treatment system further comprises a hydrogen storage article, wherein the second hydrogen injection article is configured for intermittent introduction of hydrogen stored in the hydrogen storage article.

In a still further aspect is provided an exhaust gas treatment system comprising a monolithic wall-flow filter catalytic article comprising a substrate having an axial length L, a diameter D, and a volume, wherein the substrate comprises a front, upstream end and a rear, downstream end defining the axial length and an aspect ratio defined by L/D of from about 1 to about 20; the substrate having a functional coating composition disposed thereon, the functional coating composition comprising a first sorbent composition; an oxidation catalyst composition, and optionally, a second sorbent composition; and a flow-through monolith article downstream of and in fluid communication with the monolithic wall-flow filter catalytic article, the flow-through monolith article comprising a substrate having a selective catalytic reduction (SCR) coating composition disposed thereon, the SCR coating composition comprising a first SCR, catalyst composition and a second SCR catalyst composition, wherein the second SCR catalyst composition comprises a molecular sieve comprising a base metal.

In some embodiments, the exhaust gas treatment system further comprises a urea injector upstream of and in fluid communication with the flow-through monolith article. In some embodiments, the exhaust gas treatment system further comprises an ammonia injector in fluid communication with and configured to introduce ammonia upstream of the flow-through monolith article.

In some embodiments, the exhaust gas treatment system further comprises a hydrogen injection article configured to introduce hydrogen upstream of the flow-through monolith article.

In some embodiments, the exhaust gas treatment system further comprises a hydrogen storage article, wherein the hydrogen injection article is configured for intermittent introduction of hydrogen stored in the hydrogen storage article.

In some embodiments, the exhaust gas treatment system exhibits an increase in backpressure or a pressure drop, measured as a function of air flow, of ≤25% relative to an exhaust gas treatment system having the same construction and configuration without the functional coating compositions disposed thereon.

In a still further aspect is provided a vehicle comprising the exhaust gas treatment system as described herein.

In yet another further aspect is provided a method for treating an exhaust stream containing NO and/or CO and/or HC and/or soot, the method comprising receiving the exhaust stream into the monolithic wall-flow filter catalytic article as described herein.

In one final aspect is provided a method for treating an exhaust stream containing $NO_x$ and/or CO and/or HC unclear soot, the method comprising receiving the exhaust stream into the exhaust gas treatment system as described herein.

The present disclosure includes, without limitation, the following embodiments.

Embodiment 1: A monolithic wall-flow filter catalytic article comprising a substrate having an axial length L, a diameter D, and a volume, wherein the substrate comprises a front, upstream end and a rear, downstream end defining the axial length; an aspect ratio defined by L/D of from about 1 to about 20; porous cell walls and a functional coating composition disposed thereon, the functional coating composition comprising a first sorbent composition, an oxidation catalyst composition, and, optionally, a second sorbent composition.

Embodiment 2: The monolithic wall-flow filter catalytic article of the preceding embodiment, wherein the aspect ratio is about 1, about 2, about 3, about 4, about 5 or about 6 to about 7, about 8, about 9, about 10, about 11, about 12, about 13, about 14, about 15, about 16, about 17, about 18, about 19, or about 20.

Embodiment 3: The monolithic wall-flow filter catalytic article of any preceding embodiment, wherein the volume of the substrate is from about 50 $cm^3$ to about 5000 $cm^3$.

Embodiment 4: The monolithic wall-flow filter catalytic article of any preceding embodiment, wherein the volume of the substrate is from about 50 $cm^3$, about 100, about 200, about 300, about 400, about 500, about 600, about 700, about 800, about 900, or about 1000 $cm^3$, to about 1500 $cm^3$, about 2000, about 2500, about 3000, about 3500, about 4000, about 4500 or about 5000 $cm^3$.

Embodiment 5: The monolithic wall-flow filter catalytic article of any preceding embodiment, wherein the substrate comprises cordierite, aluminum titanate, silicon carbide, silicon titanate, composite, metal or metal foam.

Embodiment 6: The monolithic wall-flow filter catalytic article of any preceding embodiment, wherein the substrate comprises one or more metals or metal alloys.

Embodiment 7: The monolithic wall-flow filter catalytic article of any preceding embodiment, wherein the substrate comprises one or more metals or metal alloys in the form of pellets, corrugated sheet or monolithic foam.

Embodiment 8: The monolithic wall-flow filter catalytic article of any preceding embodiment, wherein the substrate has a porosity of from about 50% to about 85%.

Embodiment 9: The monolithic wall-flow filter catalytic article of any preceding embodiment, wherein the substrate has a porosity of about 50%, about 60%, about 65% or about 70% to about 75%, about 80% or about 85%.

Embodiment 10: The monolithic wall-flow filter catalytic article of any preceding embodiment, wherein the porous cell walls have an average pore size of from about 5 microns to about 100 microns.

Embodiment 11: The monolithic wall-flow filter catalytic article of any preceding embodiment, wherein the porous cell walls have an average pore sire of about 5, about 10, about 20, about 30, about 40, about 50, about 60, about 70, about 80, about 90, or about 100 microns.

Embodiment 12: The monolithic wall-flow filter catalytic article of any preceding embodiment, wherein the first sorbent composition effectively adsorbs and/or absorbs one or more of $NO_x$, CO and HC in an exhaust gas stream.

Embodiment 13: The monolithic wall-flow filter catalytic article of any preceding embodiment, wherein the first sorbent composition is selected from the group consisting of alkaline earth metal oxides, alkaline earth metal carbonates, rare earth oxides and molecular sieves.

Embodiment 14: The monolithic wall-flow filter catalytic article of any preceding embodiment, wherein the first sorbent composition comprises a zeolite selected from the group consisting of faujasite, chabazite, clinoptilolite, mordenite, silicalite, zeolite X, zeolite Y, ultrastable zeolite Y, ZSM-5 zeolite, offretite and beta zeolite.

Embodiment 15: The monolithic wall-flow filter catalytic article of any preceding embodiment, wherein the oxidation catalyst composition effectively oxidizes one or more of NO, CO, and HC in an exhaust gas stream at a temperature of less than about 150° C.

Embodiment 16: The monolithic wall-flow filter catalytic article of any preceding embodiment, wherein the oxidation catalyst composition comprises a platinum group metal (PGM) component dispersed on a refractory metal oxide support.

Embodiment 17: The monolithic wall-flow filter catalytic article of any preceding embodiment, wherein the oxidation catalyst composition comprises a PGM component at a loading of from about 5 $g/ft^3$ to about 250 $g/ft^3$, based on the volume of the substrate.

Embodiment 18: The monolithic wall-flow filter catalytic article of any preceding embodiment, wherein the oxidation catalyst composition comprises a PGM component at a loading of from about 10 g/ft³, about 15 g/ft³, about 20 g/ft³, about 40 g/ft³ or about 50 g/ft³ to about 70 g/ft³, about 90 g/ft³, about 100 g/ft³, about 120 g/ft³, about 130 g/ft³, about 140 g/ft³, about 150 g/ft³, about 160 g/ft³, about 170 g/ft³, about 180 g/ft³, about 190 g/ft³, about 200 g/ft³, about 210 g/ft³, about 220 g/ft³, about 230 g/ft³, about 240 g/ft³ or about 250 g/ft³, based on the volume of the substrate.

Embodiment 19: The monolithic wall-flow filter catalytic article of any preceding embodiment, wherein the second sorbent composition effectively adsorbs and/or absorbs ammonia and/or $NO_x$ and subsequently releases adsorbed and/or absorbed ammonia and/or $NO_x$.

Embodiment 20: The monolithic wall-flow filter catalytic article of any preceding embodiment, wherein the second sorbent composition comprises a molecular sieve, and optionally, a PGM component.

Embodiment 21: The monolithic wall-flow filter catalytic article of any preceding embodiment, wherein the second sorbent composition comprises a small pore or medium pore molecular sieve, and optionally, a PGM component.

Embodiment 22: The monolithic wall-flow filter catalytic article of any preceding embodiment, wherein the functional coating composition comprises one or more functional coating layers.

Embodiment 23: The monolithic wall-flow filter catalytic article of any preceding embodiment, wherein the functional coating composition comprises one, two, or three functional coating layers.

Embodiment 24: The monolithic wall-flow filter catalytic article of any preceding embodiment, wherein the functional coating composition comprises two or three functional layers in a zoned configuration.

Embodiment 25: The monolithic wall-flow filter catalytic article of any preceding embodiment, wherein the functional coating is present on the substrate at a loading of from about 3.0 g/in³ to about 6.0 g/in³, based on the substrate volume.

Embodiment 26: The monolithic wall-flow filter catalytic article of any preceding embodiment, wherein the functional coating is present on the substrate at a loading of from about 3.0 g/in³, about 3.2 g/in³, about 3.4 g/in³, about 3.6 g/in³, about 3.8 g/in³, about 4.0 g/in³, about 4.2 g/in³, or about 4.4 g/in³ to about 4.6 g/in³, about 4.8 g/in³, about 5.0 g/in³, about 5.2 g/in³, about 5.4 g/in³, about 5.6 g/in³, about 5.8 g/in³, or about 6.0 g/in³ based on the substrate volume.

Embodiment 27: The monolithic wall-flow filter catalytic article of any preceding embodiment, wherein the monolithic wall-flow filter catalytic article exhibits an increase in backpressure or pressure drop, measured as a function of air flow of ≤70%, ≤60%, ≤50%, ≤45%, ≤40%, ≤35%, ≤30%, ≤25%, ≤20%, ≤15%, ≤10%, ≤9%, ≤8%, or ≤7% relative to a monolithic wall-flow filter catalytic article of the same substrate and dimensions without the functional coating compositions disposed thereon.

Embodiment 28: The monolithic wall-flow filter catalytic article of any preceding embodiment, wherein the monolithic wall-flow filter catalytic article exhibits an increase in backpressure or pressure drop, measured as a function of air flow, of ≤25% relative to a monolithic wall-flow filter article of the same substrate and dimensions without the functional coating, compositions disposed thereon.

Embodiment 29: The monolithic wall-flow filter catalytic article of any preceding embodiment, wherein the monolithic wall-flow filter catalytic article is located downstream of and in fluid communication with an internal combustion engine having an exhaust manifold.

Embodiment 30: The monolithic wall-flow filter of any preceding embodiment, wherein the monolithic wall-flow filter catalytic article is located within about 10 inches of the exhaust manifold.

Embodiment 31: A flow-through monolith catalytic article comprising a substrate, the substrate having a selective catalytic reduction (SCR) coating composition disposed thereon, the SCR coating composition comprising a first SCR catalyst composition and a second a SCR catalyst composition, wherein the second SCR catalyst composition comprises a molecular sieve comprising a base metal.

Embodiment 32: The flow-through monolith catalytic article of the preceding embodiment, wherein the first SCR catalyst composition is effective at a temperature of <250° C.

Embodiment 33: The flow-through monolith catalytic article of any preceding embodiment, wherein the second SCR catalyst composition is effective at a temperature of from about 250° C. to about 550° C.

Embodiment 34: The flow-through monolith catalytic article of any preceding embodiment, wherein the first SCR catalyst composition comprises a PGM component dispersed on a refractory metal oxide support.

Embodiment 35: The flow-through monolith catalytic article of any preceding embodiment, wherein the first SCR catalyst composition comprises a PGM component from about 5 g/ft³ to about 250 g/ft³, based on the volume of the substrate.

Embodiment 36: The flow-through monolith catalytic article of any preceding embodiment, wherein the first SCR catalyst composition comprises a PGM component of about 5 g/ft³, about 10 g/ft³, about 15 g/ft³, about 20 g/ft³, about 40 g/ft³ or about 50 g/ft³ to about 70 g/ft³, about 90 g/ft³, about 100 g/ft³, about 120 g/ft³, about 130 g/ft³, about 140 g/ft³, about 150 g/ft³, about 160 g/ft³, about 170 g/ft³, about 180 g/ft³, about 190 g/ft³, about 200 g/ft³, about 210 g/ft³, about 220 g/ft³, about 230 g/ft³, about 240 g/ft³ or about 250 g/ft³, based on the volume of the substrate.

Embodiment 37: The flow-through monolith catalytic article of any preceding embodiment, wherein the first SCR catalyst composition comprises rhodium.

Embodiment 38: The flow-through monolith catalytic article of any preceding embodiment, wherein the base metal comprises copper and/or iron.

Embodiment 39: The flow-through monolith catalytic article of any preceding embodiment, wherein the molecular sieve is an 8-ring small pore molecular sieve.

Embodiment 40: The flow-through monolith catalytic article of any preceding embodiment, wherein the molecular sieve is a zeolite having a structure selected from the group consisting of AEI, AFT, AFX, CHA, EAB, ERI, KFI, LEV, SAS, SAT and SAV.

Embodiment 41: The flow-through monolith catalytic article of any preceding embodiment, wherein the molecular sieve has a CHA crystal structure.

Embodiment 42: The flow-through monolith catalytic article of any preceding embodiment, wherein the molecular sieve is selected from the group consisting of aluminosilicate zeolites, borosilicates, gallosilicates, SAPOs, AlPOs, MeAPSOs and MeAPOs.

Embodiment 43: The flow-through monolith catalytic article of any preceding embodiment, wherein the molecular sieve is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47 and ZYT-6.

Embodiment 44: The flow-through monolith catalytic article of any preceding embodiment, wherein the molecular sieve is an aluminosilicate zeolite having a CHA crystal structure and a silica-to-alumina ratio from about 1 to about 1000.

Embodiment 45: The flow-through monolith catalytic article of any preceding embodiment, wherein the molecular sieve is an aluminosilicate zeolite having a CHA crystal structure and a silica-to-alumina ratio or about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000.

Embodiment 46: The flow-through monolith catalytic article of any preceding embodiment, wherein the base metal is present at from about 0.1 wt. % to about 10 wt. % (weight percent), based on the total weight of the molecular sieve.

Embodiment 47: The flow-through monolith catalytic article of any preceding embodiment, wherein the base metal is present at about 0.3 wt. %, about 0.5 wt. %, about 0.7 wt. %, about 1.0 wt. % or about 1.5 wt. % to about 3.0 wt. %, about 4.0 wt. %, about 5.0 wt. %, about 6.0 wt. %, about 7.0 wt. %, about 8.0 wt. %, about 9.0 wt. % or about 10 wt. % (weight percent), based on the total weight of the molecular sieve.

Embodiment 48: The flow-through monolith catalytic article of any preceding embodiment, wherein the second SCR catalyst is present on the substrate at a loading of from about 0.3 g/in$^3$ to about 4.0 g/in$^3$, based on the substrate.

Embodiment 49: The flow-through monolith catalytic article of any preceding embodiment, wherein the second SCR catalyst is present on the substrate at a loading of from about 0.3 g/in$^3$, about 0.4 g/in$^3$, about 0.5 g/in$^3$, about 0.6 g/in$^3$, about 0.7 g/in$^3$, about 0.8 g/in$^3$, about 0.9 g/in$^3$ or about 1.0 g/in$^3$ to about 1.5 g/in$^3$, about 2.0 g/in$^3$, about 2.5 g/in$^3$, about 3.0 g/in$^3$, about 3.5 g/in$^3$ or about 4.0 g/in$^3$, based on the substrate. Embodiment 50: The flow-through monolith catalytic article of any preceding embodiment, wherein the SCR coating composition comprises one or more coating layers.

Embodiment 51: The flow-through monolith catalytic article of any preceding embodiment, wherein the SCR coating composition comprises one or two SCR coating layers.

Embodiment 52: The flow-through monolith catalytic article of any preceding embodiment, wherein the SCR coating composition comprises a first SCR coating layer comprising the first SCR catalyst composition; and a second SCR coating layer comprising the second SCR catalyst composition.

Embodiment 53: The flow-through monolith catalytic article of any preceding embodiment, wherein the SCR coating composition comprises a first SCR coating layer comprising the first SCR catalyst and a second SCR coating layer comprising the second SCR catalyst composition, wherein the first SCR coating layer and the second SCR coating layer are in a zoned configuration.

Embodiment 54: The flow-through monolith catalytic article of any preceding embodiment, wherein the flow-through monolith catalytic article is located downstream of and in fluid communication with an internal combustion engine.

Embodiment 55: An exhaust gas treatment system comprising the monolithic wall-flow filter catalytic article or any preceding embodiment.

Embodiment 56: The exhaust gas treatment system of the preceding embodiment, further comprising a hydrogen injection article configured to inject or release hydrogen upstream of the monolithic wall-flow filter catalytic article.

Embodiment 57: The exhaust gas treatment system of any preceding embodiment, further comprising a hydrogen storage article.

Embodiment 58: The exhaust gas treatment system of any preceding embodiment, wherein the hydrogen injection article is configured for intermittent injection or release of hydrogen stored in the hydrogen storage article.

Embodiment 59: The exhaust gas treatment system of any preceding embodiment, wherein the hydrogen injection article is configured to inject or release stored hydrogen during a cold-start period.

Embodiment 60: A vehicle comprising the monolithic wall-flow filter catalytic article of any preceding embodiment.

Embodiment 61: A vehicle comprising the exhaust gas treatment system of any preceding embodiment.

Embodiment 62: An exhaust gas treatment system comprising the flow-through monolith catalytic article of any preceding embodiment.

Embodiment 63: The exhaust gas treatment system of any preceding embodiment, further comprising a hydrogen injection article configured to inject or release hydrogen upstream of the flow-through monolith article.

Embodiment 64: The exhaust gas treatment system of any preceding embodiment, further comprising a hydrogen storage article.

Embodiment 65: The exhaust gas treatment system of any preceding embodiment, wherein the hydrogen injection article is configured for intermittent injection or release of hydrogen stored in the hydrogen storage article.

Embodiment 66: The exhaust gas treatment system of any preceding embodiment, wherein the hydrogen injection article is configured to inject or release stored hydrogen during a cold-start period.

Embodiment 67: A vehicle comprising the flow-through monolith catalytic article or the exhaust gas treatment system of any preceding embodiment.

Embodiment 68: An exhaust gas treatment system comprising a monolithic wall-flow filter catalytic article comprising a substrate having an axial length L, a diameter D, and a volume, wherein the substrate comprises a front, upstream end and a rear, downstream end defining the axial length, an aspect ratio L/D of from about 1 to about 20, porous cell walls, and a functional coating composition disposed thereon, the functional coating composition comprising a first sorbent composition, an oxidation catalyst composition, and an ammonia sorbent composition; and a flow-through monolith catalytic article downstream of and in fluid communication with the wall-flow filter article, the flow-through monolith catalytic article comprising a substrate, the substrate having a selective catalytic reduction (SCR) coating composition disposed thereon, the SCR coating composition comprising a first SCR catalyst composition and a second a SCR catalyst composition, wherein the second SCR catalyst composition comprises a molecular sieve comprising a base metal.

Embodiment 69: The exhaust gas treatment system of any preceding embodiment, further comprising a urea injector upstream of and in fluid communication with the flow-through monolith article.

Embodiment 70: The exhaust gas treatment system of any preceding embodiment, further comprising an ammonia injector in fluid communication with and configured to inject ammonia upstream or the monolithic wall-flow filter catalytic article.

Embodiment 71: The exhaust gas treatment system of any preceding embodiment, wherein the exhaust gas treatment system is downstream of and in fluid communication with an internal combustion engine.

Embodiment 72: The exhaust gas treatment system of any preceding embodiment, comprising no further functional articles, that is, no further articles comprising substrates having a functional coating composition disposed thereon.

Embodiment 73: The exhaust gas treatment system of any preceding embodiment, wherein the monolithic wall-flow filter catalytic article is in a close-coupled position close to the engine.

Embodiment 74: The exhaust gas treatment system of any preceding embodiment, wherein the monolithic wall-flow filter catalytic article is located within about 10 inches from the engine exhaust manifold.

Embodiment 75: The exhaust gas treatment system of any preceding embodiment, wherein the exhaust gas treatment system exhibits an increase in backpressure or pressure drop, measured as a function of air flow, of ≤70%, ≤60%, ≤50%, ≤45%, ≤40%, ≤35%, ≤30%, ≤5%, ≤20%, ≤15%, ≤10%, ≤9%, ≤8%, or ≤7% relative to an exhaust gas treatment system having the same construction and configuration and not having the functional coating compositions disposed thereon.

Embodiment 76: The exhaust gas treatment system or any preceding embodiment, wherein the exhaust gas treatment system exhibits an increase in a backpressure or a pressure drop, measured as a function of air flow, of ≤25% relative to an exhaust gas treatment system having the same construction and configuration and not having the functional coating compositions disposed thereon.

Embodiment 77: The exhaust gas treatment system of any preceding embodiment, wherein the exhaust gas treatment system is located downstream of and in fluid communication with an internal combustion engine having an exhaust manifold.

Embodiment 78: The exhaust gas treatment system of any preceding embodiment, wherein the monolithic wall-flow filter catalytic article is located within about 10 inches of the exhaust manifold.

Embodiment 79: The exhaust gas treatment system of any preceding embodiment, further comprising a hydrogen injection article configured to inject or release hydrogen upstream of the monolithic wall-flow filter catalytic article.

Embodiment 80: The exhaust gas treatment system of any preceding embodiment, further comprising a hydrogen storage article.

Embodiment 81: The exhaust gas treatment system of any preceding embodiment, wherein the hydrogen injection article is configured for intermittent injection or release of hydrogen stored in the hydrogen storage article.

Embodiment 82: The exhaust gas treatment system of any preceding embodiment, wherein the hydrogen injection article is configured to inject or release hydrogen stored in the hydrogen storage article during a cold-start period.

Embodiment 83: A vehicle comprising the exhaust gas treatment system of any preceding embodiment.

Embodiment 84: A method for treating an exhaust stream containing $NO_x$ and/or CO and/or HC and/or soot, the method comprising receiving the exhaust stream into the monolithic wall-flow filter catalytic article of any preceding embodiment.

Embodiment 85: A method for treating an exhaust stream containing $NO_x$ and/or CO and/or HC and/or soot, the method comprising receiving the exhaust stream into the flow-through monolith catalytic article of any preceding embodiment.

Embodiment 86: A method for treating an exhaust stream containing $NO_x$, and/or CO and/or HC and/or soot, the method comprising receiving the exhaust stream into the exhaust gas treatment system of any preceding embodiment.

Embodiment 87: The method of embodiment 84, further comprising introducing hydrogen upstream of the monolithic wall-flow filter catalytic article.

Embodiment 88: The method of embodiment 85 or 87, further comprising introducing hydrogen upstream of the flow-through monolith article.

Embodiment 89: The method of any of embodiments 84 to 88, further comprising introducing ammonia or urea upstream from the flow-through monolith article.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1A is a perspective view of a monolithic wall-flow filter catalytic article substrate;

FIGS. 2A, 2B and 2C illustrate various coating configurations on the walls of a substrate;

FIG. 3 is a schematic depiction of an exhaust treatment system downstream of and in fluid communication with an internal combustion engine;

FIG. 5 is a graphical comparison of engine-out CO emissions between the vehicle trace and simulator.

DETAILED DESCRIPTION OF THE INVENTION

Figure 1B:
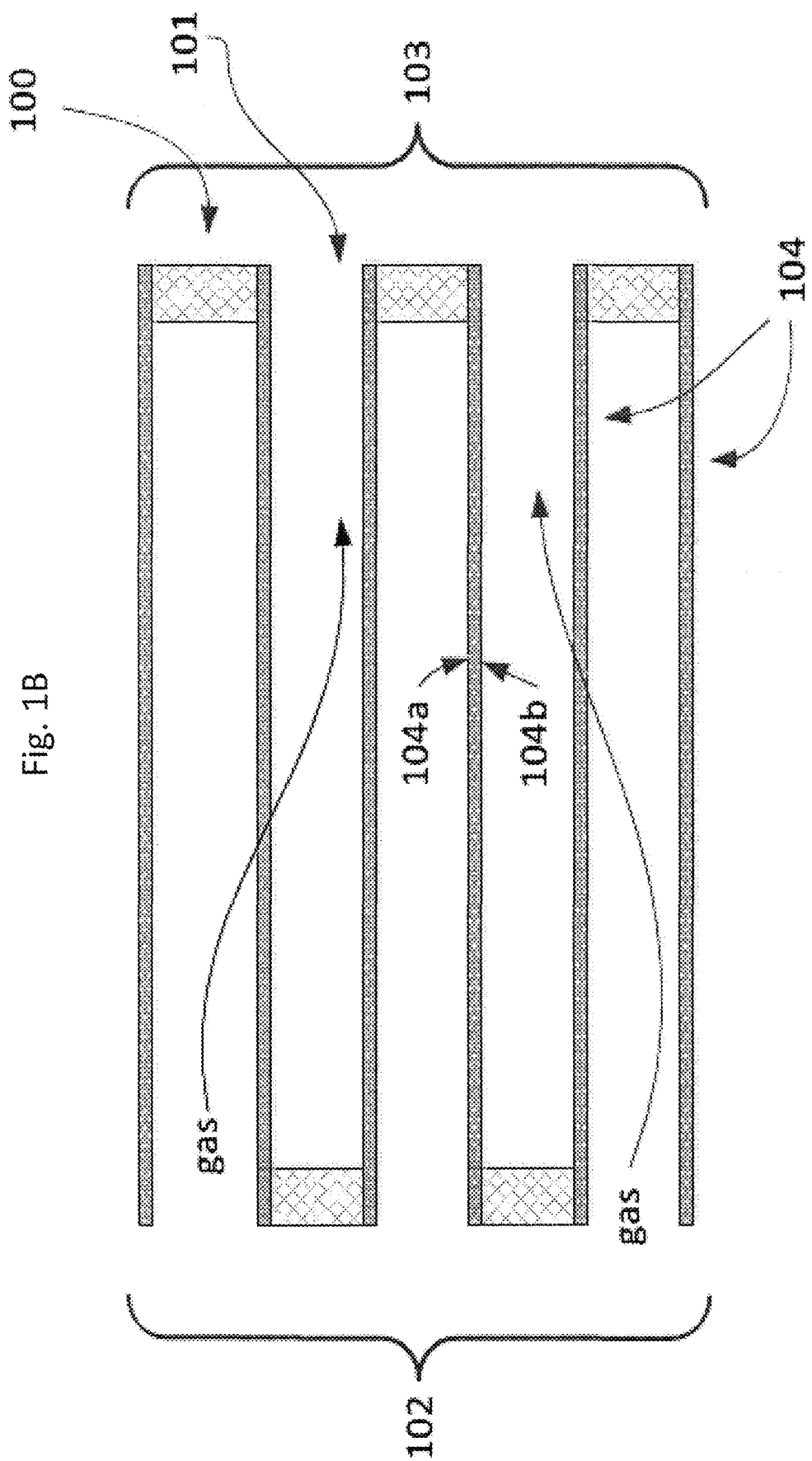
FIG. 1B is a cross-sectional view of a section of a monolithic wall-flow filter catalytic article substrate.

The present invention is aimed at simplified exhaust gas treatment systems and methods for abatement of pollutants in an exhaust gas stream of an internal combustion engine. Among other things, the invention provides a monolithic wall-flow filter catalytic article that functions as both a diesel oxidation catalyst (DOC) and a catalyzed soot filter (CSF). One aspect of the invention is the recognition that combining both functions in one catalytic filter article allows for a lower catalyst loading, without sacrificing efficacy, as well as a lower pressure drop as described herein. In certain useful embodiments, the catalytic filter article comprises a substrate having an axial length L, a diameter D, and a volume, wherein the substrate comprises a front, upstream end and a rear, downstream end defining the axial length, and an aspect ratio defined by L/D of from about 1 to about 20. In certain useful embodiments, the catalytic filter article is metallic. In certain useful embodiments, the catalytic filter is constructed from a metallic foam and/or a metallic sieve. The low aspect ratio provides a catalytic article that can be close-coupled to the engine manifold, allowing for a more rapid temperature increase to reach operating temperatures. The catalytic filter article also comprises a functional coating composition disposed on the substrate, the functional coating composition comprising a first sorbent composition, an oxidation catalyst composition, and optionally, a second sorbent composition.

The invention also provides exhaust gas treatment systems comprising the disclosed catalytic filter article in fluid communication with a flow-through monolith catalytic article that functions as a selective catalytic reduction (SCR) article. In certain embodiments, such exhaust gas treatment systems also include a hydrogen injection article that introduces hydrogen upstream of the catalytic filter article. By using hydrogen as the reductant, the pollutant abatement performance of the catalytic filter article can be improved, along with the downstream SCR performance for $NO_x$ removal.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The present invention is directed to simplified exhaust gas treatment systems and methods for abatement of pollutants in an exhaust gas stream of an internal combustion engine. The present systems comprise one or more "functional articles" or simply "articles". The term "functional article" in the invention means an article comprising a substrate having a functional coating composition disposed thereon, in particular a catalyst composition and/or sorbent coating composition. Functional coating compositions contain "sorbent" and/or "catalyst" compositions. In general, substrates are ceramic or metal having a honeycomb structure. Functional articles comprise one or more certain functional elements, for instance reservoirs, tubing, pumps, valves, batteries, circuitry, meters, nozzles, reactors, filters, funnels and the like. The systems are integrated, that is, having interconnected articles and/or elements.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The term "catalyst" refers to a material that promotes a chemical reaction. The catalyst includes the "catalytically active species" and the "support" that carries or supports the active species. For example, molecular sieves, including zeolites, are supports for certain active catalytic species (e.g., metals including copper). Likewise, refractory metal oxide particles may be a carrier for platinum group metal catalytic species.

The catalytically active species are also termed "promoters" as they promote chemical reactions. As used herein, the term "promoted" refers to a component that is intentionally added to the molecular sieve material, typically through ion exchange, as opposed to impurities inherent in the molecular sieve. For instance, the present base metal-containing molecular sieves may be termed base metal-promoted molecular sieves. A "promoted molecular sieve" refers to a molecular sieve to which catalytically active species are intentionally added. For example, in order to promote the selective catalytic reduction of nitrogen oxides in the presence of ammonia, in one or more embodiments, a suitable metal is independently exchanged into the molecular sieve. According to one or more embodiments, the molecular sieve is promoted with a base metal such as copper, although other catalytic metals could be used without departing from the invention, such as manganese, cobalt, iron, nickel, cerium, platinum, palladium, rhodium or combinations thereof. Typical amounts of promoter metal include about 0.5 to about 15% by weight of the catalyst composition.

The term "catalytic article" in the invention means an article comprising a substrate having a catalyst coating composition.

The term "configured" as used in the description and claims is intended to be an open-ended term as are the terms "comprising" or "containing". The term "configured" is not meant to exclude other possible articles or elements. The term "configured" may be equivalent to "adapted".

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

"Platinum group metal components" refer to platinum group metals or one of their oxides. "Rare earth metal components" refer to one or more oxides of the lanthanum series defined in the Periodic Table of Elements, including lanthanum, cerium, praseodymium and neodymium.

As used herein, the term "selective catalytic reduction" (SCR) refers to the catalytic process of reducing oxides of nitrogen to dinitrogen ($N_2$) using a reductant. The reductant may be nitrogenous (e.g., ammonia or an ammonia precursor, such as urea), or may be non-nitrogenous (e.g., hydrogen). In certain embodiments, more than one reductant may be used together alternately or simultaneously. As used herein, the terms "nitrogen oxides" or "$NO_x$" designate the oxides of nitrogen.

The term "sorbent" refers to a material that adsorbs and/or absorbs a desired substance, in this invention NO and/or CO and/or HC and/or $NH_2$. Sorbents may advantageously adsorb and/or absorb (store) a substance at a certain temperature and desorb (release) the substance at a higher temperature.

As used herein, the term "substrate" refers to the monolithic material onto which the catalyst composition, that is, catalytic coating, is disposed, typically in the form of a washcoat. In one or more embodiments, the substrates are flow-through monoliths or monolithic wall-flow filters. A washcoat is formed by preparing a slurry containing a specified solids content (e.g., 30-90% by weight) of catalyst composition in a liquid, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. The washcoat containing, for example, a metal-promoted molecular sieve, can optionally comprise a binder selected from silica, alumina, titania, zirconia, ceria, or a combination thereof. The loading of the binder is about 0.1 to 10 wt. % based on the weight of the washcoat.

The term "vehicle" means, for instance, any vehicle having an internal combustion engine and includes for instance passenger automobiles, sport utility vehicles, minivans, vans, trucks, buses, refuse vehicles, freight trucks, construction vehicles, heavy equipment, military vehicles, farm vehicles and the like.

Unless otherwise indicated, all pans and percentages are by weight. "Weight percent (wt %)," if not otherwise indicated, is based on an entire composition free of any volatiles, that is, based on dry solids content.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

In one aspect, the present invention provides a simplified exhaust gas treatment systems and methods for abatement of pollutants in an exhaust gas stream of an internal combustion engine. The disclosure provides compositions, catalytic articles, exhaust gas treatment systems, and methods for oxidation and selective catalytic reduction (SCR) of exhaust gas streams containing $NO_x$ and/or CO and/or HC and/or soot.

Accordingly, the monolithic wall-now filter catalytic article, the flow-through monolith catalytic article, and their individual components (substrates, sorbent compositions, oxidative catalytic compositions, SCR catalytic compositions, and their respective coating configurations) are described herein below.

Substrates

In one or more embodiments, the catalyst compositions as disclosed herein are disposed on a substrate to form a catalytic article. The present substrates for catalytic articles are three-dimensional, having a length and a diameter and a volume, similar to a cylinder. The shape does not necessarily have to conform to a cylinder. The length is an axial length defined by an inlet end and an outlet end. The diameter is the largest cross-section length, for example the largest cross-section if the shape does not conform exactly to a cylinder.

Any suitable substrate for the catalytic articles disclosed herein may be employed, such as a monolithic substrate of the type having line, parallel gas flow passages extending there through from an inlet or an outlet face of the substrate such that passages are open to fluid flow there through ("flow-through monolith"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through substrates and wall-flow filters will be further discussed herein below.

In one or more embodiments, the substrate is a ceramic or metal having a honeycomb structure. Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

In certain preferred embodiments, substrates may also be metallic, comprising one or more metals or metal alloys. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel.

Examples of metallic substrates include those having straight channels, those having protruding blades along the axial channels to disrupt gas flow and to open communication of gas flow between channels, and those having blades and also holes to enhance gas transport between channels allowing for radial gas transport throughout the monolith.

Monolithic Wall-Flow Filter Catalyst Article Substrates

In one aspect is provided a monolithic wall-flow filter catalytic article comprising a substrate having an axial length L, a diameter D, and a volume, wherein the substrate comprises a front, upstream end and a rear, downstream end defining the axial length, and an aspect ratio defined by L/D of from about 1 to about 20. FIG. 1A is a perspective view of an exemplary wall-flow filter substrate.

Wall-flow filter substrates useful for the present monolithic wall-flow filter catalytic articles have a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. A cross-section view of a monolithic wall-flow filter substrate section is illustrated in FIG. 1B, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104$a$ and outlet side 104$b$. The passages are enclosed by the cell walls.

The wall-flow filter catalytic article substrate may have a volume of, for instance, from about 50 $cm^3$, about 100 $cm^3$, about 200 $cm^3$, about 300 $cm^3$, about 400 $cm^3$, about 500 $cm^3$, about 600 $cm^3$, about 700 $cm^3$, about 800 $cm^3$, about 900 $cm^3$ or about 1000 $cm^3$ to about 1500 $cm^3$, about 2000 $cm^3$, about 2500 $cm^3$, about 3000 $cm^3$, about 3500 $cm^3$, about 4000 $cm^3$, about 4500 $cm^3$ or about 5000 $cm^3$.

Wall-flow filter article substrates typically have a wall thickness from about 50 microns to about 2000 microns, for example from about 50 microns to about 450 microns or from about 150 microns to about 400 microns.

The walls of the wall-flow filter catalytic article substrate are porous and generally have a wall porosity of at least about 50% or at least about 60% with an average pore size of at least about 5 microns prior to disposition of the functional coating. For instance, the wall-flow filter catalytic article substrate will have a porosity of ≥50%, ≥60%, ≥65% or ≥70%. For instance, the wall-flow filter catalytic article substrate will have a wall porosity of from about 50%, about 60%, about 65% or about 70% to about 75%, about 80% or about 85% and an average pore size of from about 5 microns, about 10 microns, about 20 microns, about 30 microns, about 40 microns or about 50 microns to about 60 microns, about 70 microns, about 80 microns, about 90 microns or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using Bill (Barrett-Joyner-Halenda) calculations and 33 desorption points. Useful wall-flow filters have high porosity, allowing high loadings of catalyst compositions without excessive backpressure during operation.

Wall-flow filter article substrates that are useful in the context of the present disclosure typically have an aspect ratio (length/diameter or LD) of from about 1 to about 20, for example from about 1.0, about 2.0, about 3.0, about 3.5, about 4.0, about 4.5, about 5.0 or about 5.5 to about 6.0, about 6.5, about 7.0, about 7.5, about 8.0, about 8.5, about 9.0, about 9.5, about 10.0, about 11.0, about 12.0, about 13.0, about 14.0, about 15.0, about 16.0, about 17.0, about 18.0, about 19.0 or about 20.0. By aspect ratio is meant the ratio of length to diameter of the filter. For instance, the present wall-flow filter article substrates may have an aspect ratio of from about 3 to about 10. The high aspect ratio allows the wall-flow filter to be fitted in a close-coupled position close to the engine. This allows for fast heat-up of the catalyst composition; the exhaust gas will heat up the catalyst composition to the operating (catalytic) temperature faster than if it were located more distantly from the engine, e.g., in an under-floor position. A close-coupled position is, for instance, within about 12 inches (in) from the exhaust manifold (i.e., where individual cylinder exhaust pipes join together). In some embodiments, the distance from the exhaust manifold to the upstream end of the wall-flow filter article substrate unit is from about 0.5 in to about 12 inches. In some embodiments, the distance is about 0.5 in, about 1 in, about 2 in, about 3 in, about 4 in, about 5 in, about 6 in, about 7 in, about 8 in, about 9 in, about 10 in, about 11 in or about 12 in. Metallic substrates, in particular, are advantageously employed in certain embodiments in a close-coupled position, allowing for fast heat-up. In addition, the invention recognizes that the use of a metallic substrate in the monolithic wall-flow filter catalytic article of the invention is advantageous for minimizing undesirable pressure drops, which may be observed at times with ceramic substrates.

The wall-flow filter catalytic article substrate can be catalyzed, in that the wall of the substrate has thereon one or more catalytic materials. Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet and/or outlet walls of the substrate as described herein.

Catalyzed wall-flow filters are disclosed, for instance, in U.S. Pat. No. 7,229,597, which is incorporated herein by reference in its entirety. This reference teaches a method of applying a catalytic coating such that the coating permeates the porous walls, that is, is dispersed throughout the walls. Flow-through and wall-flow substrates are also taught, for example, in International Application Publication No. WO2016/070090, which is incorporated herein by reference in its entirety.

Flow-Through Monolith Substrates

In some embodiments, a flow-through monolith catalytic article is provided downstream of and in fluid communication with the wall-flow filter catalytic article.

Typically, flow-through monolith substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and sire such as trapezoidal, rectangular, square, sinusoidal, hexagonal, oval, circular, etc. The flow-through monolith is ceramic or metallic as described above.

Flow-through monolith substrates for example have a volume of from about 50 in to about 1200 $in^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Figure 1D:
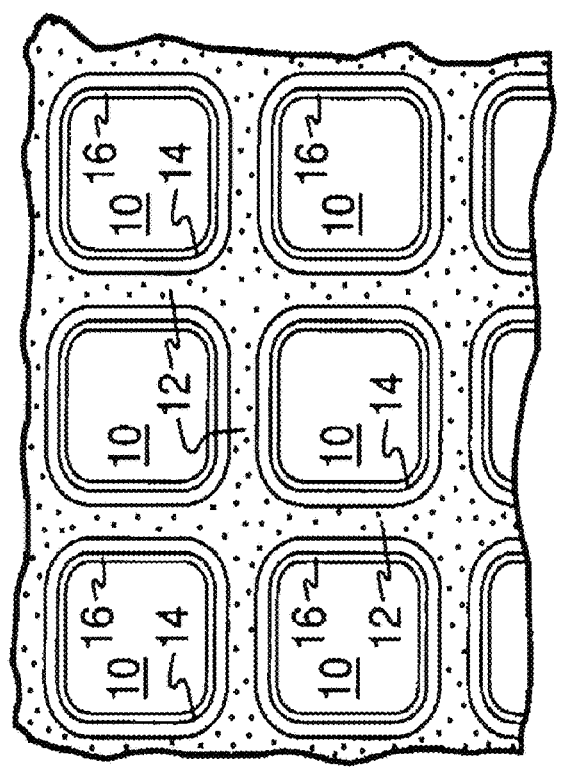
FIG. 1D is a cross-sectional view of a section or flow-through monolith catalytic article substrate.
Figure 1C:
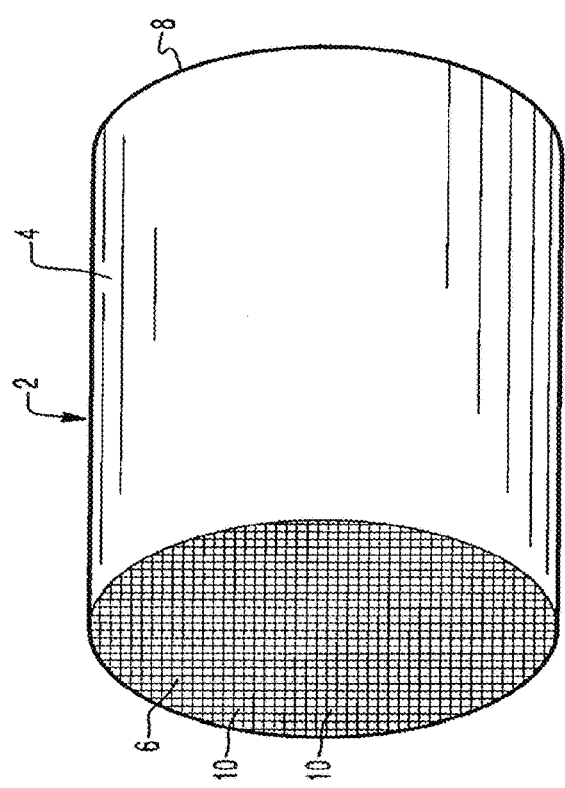
FIG. 1C is a perspective view of a flow-through monolith catalytic article substrate.

In one or more embodiments, the flow-through monolith substrate is selected from one or more of a flow-through honeycomb monolith or a particulate filter, to which the catalytic coating is applied to the substrate as a washcoat. FIGS. 1C and 1D illustrate an exemplary substrate 2 in the form of a flow-through substrate coated with a catalyst composition as described herein. Referring to FIG. 1C, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1D, flow passages 10 are formed by walls 12 and extend through carrier 2 from upstream end face 6 to downstream end face N, the passages 10 being unobstructed so as to permit the flow of a fluid, e.g., a gas stream, longitudinally through carrier 2 via gas flow passages 10 thereof. As more easily seen in FIG. 1D, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 1D. Further coating configurations are disclosed herein below.

Functional Coating Composition

The monolithic wall-flow filter catalytic article generally comprises a wall flow filter substrate (as described above) having a functional coating composition disposed thereon, the functional coating composition comprising a first sorbent composition, an oxidation catalyst composition, and optionally, a second sorbent composition. Accordingly, each component is described herein below.

First Sorbent Composition

The first sorbent composition may be suitable to adsorb and/or absorb $NO_x$ and/or CO and/or HC components of exhaust gas. Suitable sorbents include, but are not limited to, materials such as alkaline earth metal oxides, alkaline earth metal carbonates, rare earth oxides and molecular sieves, included are oxides or carbonates of Mg, Ca, Sr or Ba and/or oxides of Ce, La, Pr or Nd. Sorbent molecular sieves include zeolites.

Advantageously, the first sorbent comprises a molecular sieve. In some embodiments, these molecular sieves are selected from $H^+$-forms of large pore molecular sieves such as Beta zeolite. Also suitable are base metal-containing molecular sieves including FeBeta and CuCHA. Other large pore molecular sieves are those listed above and also ZSM-12, SAPO-37, etc. The molecular sieve suitable for HC adsorption may be the same or different than the molecular sieve of the ceria-containing molecular sieve.

The molecular sieves are, for instance, porous molecular sieve particles wherein greater than 90% of the molecular sieve particles have a particle size greater than 1 μm. In some embodiments, the molecular sieve particle size has a $d_{50}$ less than 80 microns. In one or more embodiments, the molecular sieve particles have a $d_{50}$ less than 80, 70, 60, 55, 50, 45, 40, 35, 30, 25, 20, 15, or 10 microns. In some embodiments, the molecular sieve particle size has a $d_{50}$ less than 50 microns. In some embodiments, greater than 95% of the molecular sieve particles have a particle size greater than 1 μm and in more specific embodiments, greater than 96% of the molecular sieve particles have a particle size greater than 1 μm and in even more specific embodiments, the molecular sieve particle component comprises about 96% particles greater than 1 μm and about 85% of particles greater than 2 μm, and in highly specific embodiments, the molecular sieve particle component comprises about 96% particles within 5 μm of the mean particle size and the mean particle size is greater than about 5 μm. In one or more embodiments, the molecular sieve particle component comprises 96% particles in the range of about 1 μm to 10 μm. Molecular sieves suitable for adsorption are disclosed, for example, in U.S. Pre-Grant Publication No. 2016/0136626 and U.S. Pat. No. 9,321,042, each of which is incorporated by reference herein in their entirety.

The first sorbent composition advantageously comprises a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a Beta zeolite. Zeolite adsorbent materials may have a high silica-to-alumina (SAR) ratio. The zeolites may have a silica/alumina molar ratio of from at least about 5:1, preferably at least about 50:1, with useful ranges of from about 5:1 to 1000:1, 50:1 to 500:1, as well as about 25:1 to 300:1. Suitable zeolites include ZSM, Y and Beta zeolites. A HC adsorbent may comprise, e.g., a beta zeolite of the type disclosed in U.S. Pat. No. 6,171,556, which is incorporated herein by reference in its entirety.

The present molecular sieves comprise small pore, medium pore and large pore molecular sieves or combinations thereof. A small pore molecular sieve contains channels defined by up to eight tetrahedral atoms. A medium pore molecular sieve contains channels defined by ten-membered rings. A large pore molecular sieve contains channels defined by twelve-membered rings.

Small pore molecular sieves are selected from the group consisting aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal-containing silico-aluminophosphate (MeSAPO) molecular sieves and mixtures thereof. For example, small pore molecular sieves are selected from the group consisting of framework types ACO, AEI, AEN, AFN, AFT, AFX, ANA, ARC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof. For instance, the small pore molecular sieve is selected from the group of framework types CHA, LEV, AEI, AFX, ERI, SFW, KFI, DDR and ITE.

Medium pore molecular sieves are selected from the group consisting of framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. For instance, the medium pore molecular sieves are selected from the group consisting of framework types FER, MEL, MFI and STT.

Large pore molecular sieves are selected from the group consisting of framework types AFI, AFR, AFS, AFT, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof. For instance, the large pore molecular sieves are selected from the group consisting of framework types AFI, BEA, MAZ, MOR and OFF.

For example, molecular sieves comprises a framework type selected from the group consisting of AEI, BEA (beta zeolites), CHA (chabazite), FAU (zeolite Y), FER (ferrierite), MFI (ZSM-5) and MOR (mordenite). Non-limiting examples of zeolites having these structures include chabazite, faujasite, zeolite Y, ultrastable zeolite Y, beta zeolite, mordenite, silicalite, zeolite X, and ZSM-5.

The present molecular sieves may exhibit a high surface area, for example a BET surface area. determined according to DIN 66131, of at least about 400 m$^2$/g, at least about 550 m$^2$/g or at least about 650 m$^2$/g, for example from about 400 to about 750 m$^2$/g or from about 500 to about 750 m$^2$/g. The present molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a crystal size greater than 0.1 microns or 1 micron and less than 5 microns.

Useful molecular sieves have 8-ring pore openings and double-six ring secondary building units, for example, those having structure types AEI, AFT, AFX, CHA, EAB, ERI, KFI, LEV, SAS, SAT or SAV.

Included are any and all isotopic framework materials such as SAPO, AlPO and MeAlPO materials having the same structure type.

Aluminosilicate zeolite structures do not include phosphorus or other metals isomorphically substituted in the framework. That is, "aluminosilicate zeolite" excludes aluminophosphate materials such as SAPO, AlPO and MeAPO materials, while the broader term "zeolite" includes aluminosilicates and aluminophosphates. For the purposes of this disclosure, SAPO, AlPO and MeAPO materials are considered non-zeolitic molecular sieves.

The 8-ring small pore molecular sieves include aluminosilicates. borosilicates, gallosilicates. MeAPSOs and MeAPOs. These include for example SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44 and CuSAPO-47. In some embodiments, the 8-ring small pore molecular sieve will have an aluminosilicate composition, such as SSZ-13 and SSZ-62.

In one or more embodiments, the 8-ring small pore molecular sieve has the CHA crystal structure and is selected from the group consisting of aluminosilicate zeolite having the CHA crystal structure, SAPO, AlPO and MeAlPO. For example, the 8-ring small pore molecular sieve having the CHA crystal structure is an aluminosilicate zeolite having the CHA crystal structure. In one embodiment, the 8-ring small pore molecular sieve having the CHA crystal structure will have an aluminosilicate composition, such as SSZ-13 and SSZ-62.

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite includes a naturally occurring tectosilicate mineral of a zeolite group with approximate formula (Ca, Na$_2$, K$_2$, Mg)Al$_2$Si$_4$O$_{12}$-6H$_2$O (i.e., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956). Barrer et al.: Zeolite D, described in British Patent No. 868,846 (1961); and Zeolite R, described in U.S. Pat. No. 3,030,181, each of which is hereby incorporated by reference. Synthesis of another synthetic form of zeolitic chabazite, SSZ-13, is described in U.S. Pat. No. 4,544,538, which is hereby incorporated by reference. Synthesis or a synthetic form of a non-zeolitic molecular sieve having the chabazite crystal structure, silicoaluminophosphate 34 (SAPO-34), is described in U.S. Pat. Nos. 4,440,871 and 7,264,789, each of which is hereby incorporated by reference. A method of making yet another synthetic non-zeolitic molecular sieve having chabazite structure. SAPO-44, is described for instance in U.S. Pat. No. 6,162,415, which is hereby incorporated by reference.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are between 1 hr and 30 days and in some embodiments, from 10 hours to 3 days. At the conclusion of the reaction, the pH is optionally adjusted to between 6 and 10. for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C. Molecular sieves having a CHA structure may be prepared, for instance, according to methods disclosed in U.S. Pat. Nos. 4,544,538 and 6,709,644, each of which is hereby incorporated by reference.

The molecular sieves may have an SAR of from about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000. For instance, present molecular sieves may have an SAR of from about 5 to about 250, from about 10 to about 200, from about 2 to about 300, from about 5 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60, or from about 20 to about 50.

Oxidation Catalyst Composition

The oxidation catalyst composition is suitable, for example, to oxidize NO and/or CO and/or HC components of exhaust gas, for example at a relatively low temperature of <150° C. Suitable oxidation catalyst compositions advantageously comprise a platinum group metal (PGM) dispersed on a refractory metal oxide support.

The support material on which the catalytically active PGM is deposited, for example, comprises a refractory metal oxide, which exhibits chemical and physical stability at high temperatures, such as the temperatures associated with gasoline or diesel engine exhaust. Exemplary metal oxides include alumina, silica, zirconia, titania, cerin, praseodymia, tin oxide and the like, as well as physical mixtures or chemical combinations thereof, including atomically-doped combinations and including high surface area or activated compounds such as activated alumina.

Included are combinations of metal oxides such as silica-alumina, ceria-zirconia, praseodymia-cerin, alumina-zirconia, alumina-coria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of about 60 to about 350 $m^2/g$, for example from about 90 to about 250 $m^2/g$.

In certain embodiments, metal oxide supports useful in the catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$).

Advantageously, a refractory metal oxide may be doped with one or more additional basic metal oxide materials such as lanthanum oxide, barium oxide, strontium oxide, calcium oxide, magnesium oxide or combinations thereof. The metal oxide dopant is typically present in an amount of about 1 to about 20% by weight, based on the weight of the catalyst composition. The dopant oxide materials may serve to improve the high temperature stability of the refractory metal oxide support or function as a sorbent for acidic gases such as $NO_2$, $SO_2$ or $SO_3$. The dopant metal oxides can be introduced using an incipient wetness impregnation technique or by addition of colloidal mixed oxide particles. Doped metal oxides include baria-alumina, baria-zirconia. baria-titania, baria-zirconia-alumina, lanthana-zirconia and the like.

Thus, the refractory metal oxides or refractory mixed metal oxides in the oxidation catalyst composition is typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. Further doping with basic metal oxides provides additional useful refractory oxide supports including but not limited to baria-alumina, baria-zirconia, baria-titania, baria-zirconia-alumina, lanthana-zirconia and the like.

The oxidation catalyst composition may comprise any of the above named refractory metal oxides and in any amount. For example, refractory metal oxides in the catalyst composition may comprise at least about 15 wt. %, at least about 20 wt. %, at least about 25 wt. %, at least about 30 wt. % or at least about 35 wt. % alumina, where the wt. % is based on the total dry weight of the catalyst composition. The catalyst composition may for example comprise from about 10 wt. % to about 99 wt. % alumina, from about 15 wt. % to about 95 wt. % alumina, or from about 20 wt. % to about 85 wt. % alumina.

The oxidation catalyst composition comprises, for example, from about 15 wt. %, about 20 wt. %, about 25 wt. %, about 30 wt. % or about 35 wt. % to about 50 wt. %, about 55 wt. %, about 60 wt. % about 65 wt. % or about 70 wt. % alumina based on the weight of the catalytic composition. Advantageously, the oxidation catalyst composition may comprise ceria, alumina and zirconia or doped compositions thereof.

The oxidation catalyst composition coated onto the monolithic wall-flow filter substrate may comprise a PGM component from about 0.1 wt. %, about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry composition.

The PGM component of the oxidation catalyst composition is, for example, present from about 5 $g/ft^3$, 10 $g/ft^3$, about 15 $g/ft^3$, about 20 $g/ft^3$, about 40 $g/ft^3$ or about 50 $g/ft^3$ to about 70 $g/ft^3$, about 90 $g/ft^3$, about 100 $g/ft^3$, about 120 $g/ft^3$, about 130 $g/ft^3$, about 140 $g/ft^3$, about 150 $g/ft^3$, about 160 $g/ft^3$, about 170 $g/ft^3$, about 180 $g/ft^3$, about 190 $g/ft^3$, about 200 $g/ft^3$, about 210 $g/ft^3$, about 220 $g/ft^3$, about 230 $g/ft^3$, about 240 $g/ft^3$ or about 250 $g/ft^3$, based on the volume of the substrate.

The oxidation catalyst composition, in addition to the refractory metal oxide support and catalytically active metal, may further comprise any one or combinations of the oxides of lanthanum. barium, praseodymium, neodymium, samarium, strontium, calcium, magnesium, niobium, hafnium, gadolinium, terbium, dysprosium, erbium, ytterbium, manganese, iron, chromium, tin, zinc, nickel, cobalt, or copper.

Second Sorbent Composition

The optional second sorbent composition is advantageously effective to adsorb and/or absorb ammonia and/or $NO_x$ and release the stored ammonia and/or $NO_x$ under certain conditions. Released ammonia may be employed in downstream SCR reactions. For instance, stored ammonia may be released during acceleration of the engine.

The second sorbent may comprise a molecular sieve as described above for the first sorbent composition. Advantageously, the second sorbent comprises small pore or medium pore molecular sieves. The second sorbent may, in some embodiments, advantageously be different than the first sorbent. In some embodiments, the second sorbent comprises a platinum group metal (PGM). In some embodiments, no second sorbent composition is included within the functional composition on the wall flow filter article. In some embodiments, any excess ammonia may be effectively absorbed by, e.g. the first sorbent and/or the refractory metal oxide support and/or substrate. In some embodiments, the second sorbent adsorbs $NO_x$, for example, during cold-start conditions.

Selective Catalytic Reduction (SCR) Coating Composition

The flow-through monolith catalytic article generally comprises a flow-through substrate having a SCR coating composition disposed thereon. SCR coating compositions generally convert $NO_x$ pollutants to nitrogen and water. The SCR coating composition of the present invention is, for example, effective to operate at two different temperature ranges, in particular at low temperatures of <250° C. and at high temperatures of from about 250° C. to about 550° C. The present SCR coating composition comprises a first SCR catalyst composition and a second SCR catalyst composition, the second SCR catalyst composition comprising a molecular sieve comprising a base metal.

First SCR Catalyst Composition

Advantageously, the first SCR composition comprises one or more platinum group metals disposed on a high surface area, refractory metal oxide support, e.g., a high surface area alumina support. Suitable supports have been described herein above with respect to oxidation catalyst compositions.

The PGM suitable in the SCR composition is for instance rhodium. The PGM-based SCR catalyst composition may advantageously be effective at temperatures of ≤250° C.

The first SCR catalyst composition may comprise a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt %, about 18 wt. %, about 19 wt. % or about 20 wt. %, based on the weight of the dry first catalyst.

The PGM component of the first SCR catalyst composition is, for example, present from about 5 $g/ft^3$, 10 $g/ft^3$, about 15 about 20 $g/ft^3$, about 40 $g/ft^3$ or about 50 $g/ft^3$ to about 70 $g/ft^3$, about 90 $g/ft^3$, about 100 $g/ft^3$, about 120 $g/ft^3$, about 130 $g/ft^3$ about 140 $g/ft^3$, about 150 $g/ft^3$, about 160 $g/ft^3$, about 170 $g/ft^3$, about 180 $g/ft^3$, about 190 $g/ft^3$, about 200 $g/ft^3$, about 210 $g/ft^3$, about 220 $g/ft^3$, about 230 $g/ft^3$, about 240 $g/ft^3$ or about 250 $g/ft^3$, based on the volume of the substrate.

Second SCR Catalyst Composition

The second SCR catalyst composition comprises a base metal-containing molecular sieve catalyst composition, effective at higher temperatures of from about 250° C. to about 550° C. This catalyst composition will in general employ injected ammonia or injected urea as an ammonia precursor, where ammonia is the active reductant. In operation, one or more of hydrogen, ammonia and urea are periodically metered into the exhaust stream from a position upstream of the flow-through monolith article. The injector is in fluid communication with and upstream of the flow-through monolith article. The injector will in general also be associated with a reductant (or reductant precursor) reservoir and a pump. Reservoirs, pumps and the like are not considered functional articles.

Suitable molecular sieves have been described herein above with respect to the first sorbent. In some embodiments, the molecular sieve is an aluminosilicate zeolite having a CHA crystal structure and a silica-to-alumina ratio from about 1 to about 1000.

A suitable base metal is, for example, copper or iron or a mixture thereof. The present molecular sieves are, for example, copper- and/or iron-containing. The copper or iron resides in the ion-exchange sites (pores) of the molecular sieves and may also be associated with the molecular sieves but not "in" the pores. For example, upon calcination, non-exchanged copper salt decomposes to CuO, also referred to herein as "free copper" or "soluble copper." The free copper may be advantageous as disclosed in U.S. Pat. No. 8,404,203, which is hereby incorporated by reference herein in its entirety. The amount of free copper may be less than, equal to or greater than the amount of ion-exchanged copper.

The copper- or iron-containing molecular sieves are prepared for example via ion-exchange from for example a $Na^+$ containing molecular sieve ($Na^+$ form). The $Na^+$ form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper or iron. Optionally, the $NH_4^+$-exchanged molecular sieve is calcined to the $H^+$-form which may also be employed for ion-exchange with copper or iron cations, copper or iron is ion-exchanged into molecular sieves with alkali metal, $NH_4^+$ or $H^+$ forms with copper or iron salts such as copper acetate, copper sulfate, iron chloride, iron acetate, iron nitrate, iron sulfate and the like, for example as disclosed in U.S. Pat. No. 9,242,238, which is hereby incorporated by reference herein in its entirety. For instance a $Na^+$, $NH_4^+$ or $H^+$ form of a molecular sieve is mixed with an aqueous salt solution and agitated at an elevated temperature for a suitable time. The slurry is filtered and the filter cake is washed and dried.

Iron addition comprises, for instance, ion-exchange processes, impregnation of an iron salt or mixing a molecular sieve with iron oxide. Suitable iron-containing molecular sieves are disclosed for instance in U.S. Pat. No. 9,011,807, which is hereby incorporated by reference herein in its entirety.

The amount abase metal in the molecular sieve is for example from about 0.1, about 0.3, about 0.5, about 0.7, about 1.0 or about 1.5 to about 3.0, about 4.0 wt. %, about 5.0, about 6.0, about 7.0, about 8.0, about 9.0 or about 10 wt % (weight percent), based on the total weight of the metal-containing molecular sieve. The amount of base metal is measured and reported as the oxide.

The base metal-containing molecular sieve is present on the substrate at a loading (concentration) of for instance from about 0.3 $g/in^3$ to about 4.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$ or about 4.0 $g/in^3$ based on the substrate. This refers to dry solids weight per volume of substrate, for example per volume of a honeycomb monolith. An amount of base metal per volume would for instance be from about 0.2% to about 10% of the above values. An amount of base metal per volume is the base metal concentration. An amount of a base metal-containing molecular sieve per volume is the molecular sieve concentration. Concentration is based on a cross-section of a substrate or on an entire substrate.

A method for activating an iron-containing molecular sieve includes adding iron into a molecular sieve followed by steam-calcination of the resulting iron-containing molecular sieve powder from about 500° C. to about 800° C. for a period of from about 20 minutes to about 12 hours in the presence of water vapor or from about 650° C. to about 750° C. for a period of from about 20 minutes to about 2 hours in the presence of water vapor. The steam-calcination periods are for example from about 20 minutes to about 1 hour or 1.5 hours. The resulting steam-activated iron-containing molecular sieve powders may be spray-dried or air-dried.

The disclosed catalyst compositions and/or sorbent compositions may comprise one or more supports or "carriers" such as refractory inorganic solid oxide porous powders further comprising functionally active species. A catalyst composition may typically be applied in the form of a washcoat containing supports having catalytically active species thereon. A sorbent composition may typically be applied in the form of a washcoat containing sorption active species. Catalyst and sorbent components may also be combined in a single washcoat. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied.

Catalyst and/or sorbent compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst composition is exposed to high temperatures of at least about 600° C. for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica.

Catalytic Articles

The monolithic wall-flow filter catalytic article substrates and flow-through monolith catalytic article substrates as described herein have a functional or SCR catalytic coating, respectively, disposed thereon.

Functional coatings may, in some embodiments, comprise one thin adherent layer disposed on and in adherence to the monolithic wall-flow filter substrate. The coating layer may comprise the individual functional components, that is, the first sorbent composition, the oxidation catalyst composition and the second sorbent composition in the case of the monolithic wall-flow filter catalytic article.

The functional coating may, in other embodiments, comprise more than one thin adherent layer, the layers in adherence to each other and the coating in adherence to the substrate. The entire "functional coating" comprises the individual "coating layers". The functional coating may advantageously be "zoned", comprising zoned functional layers. This may also be described as "laterally zoned". For example, a layer may extend from the inlet end towards the outlet end extending about 10%, about 20%, about 30%, about 40%, about 50%, about 60%, about 70%, about 80% or about 90% of the substrate length. Another layer may extend from the outlet end towards the inlet end extending about 10%, about 20%, about 30%, about 40%, about 50%, about 60%, about 70%, about 80% or about 90% of the substrate length. Different coating layers may be adjacent to each other and not overlay each other. Alternatively, different layers may overlay a portion of each other, providing a third "middle" zone. The middle zone may for example extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Each of the functional compositions may reside in a separate coating layer. Thus, discussion related to different layers may correspond to any of these layers. The coating composition may comprise 1, 2 or 3 or more coating layers. The one or more coating layers together comprise the 3 functional compositions. Any coating layer comprising a present functional composition is a "functional layer".

The present zones are defined by the relationship of coating layers. With respect to different coating layers, there are a number of possible zoning configurations. For example, there may be an upstream zone and a downstream zone, there may be an upstream zone, a middle zone and a downstream zone, there may be four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

One or more of the functional coating layers may be in direct contact with the monolithic wall-flow filter substrate. Alternatively, one or more "undercoats" may be present, so that at least a portion a functional coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two tones. In the case of an "undercoat" or "overcoat" the gap between the different layers is termed an "'interlayer."

An undercoat is a layer "under" a coating layer, an overcoat is a layer "over" a coating layer and an interlayer is a layer "between" two coating layers.

The interlayer(s), undercoat(s) and overcoat(s) may contain one or more functional compositions or may be free of functional compositions. The present functional coatings may comprise more than one identical layers.

Figure 2A:
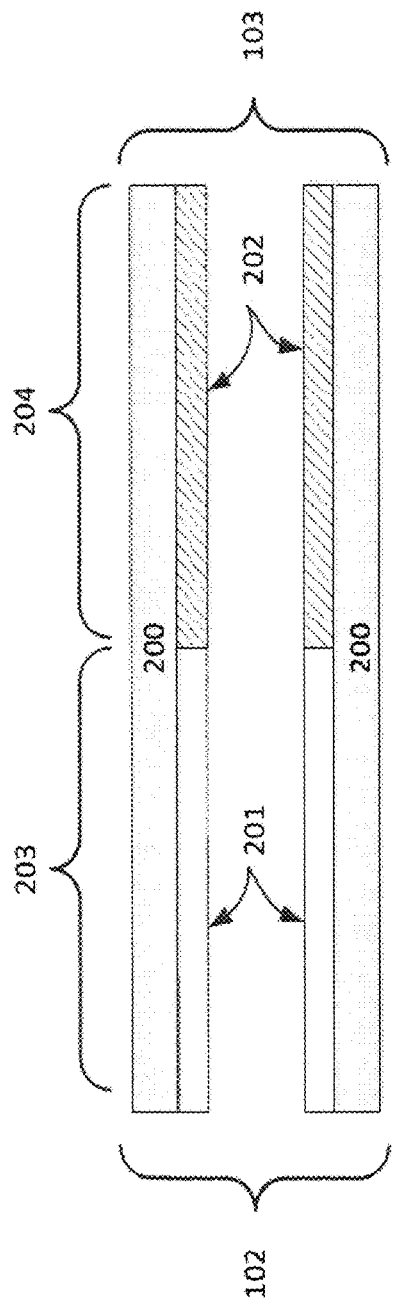
Figure 2B:
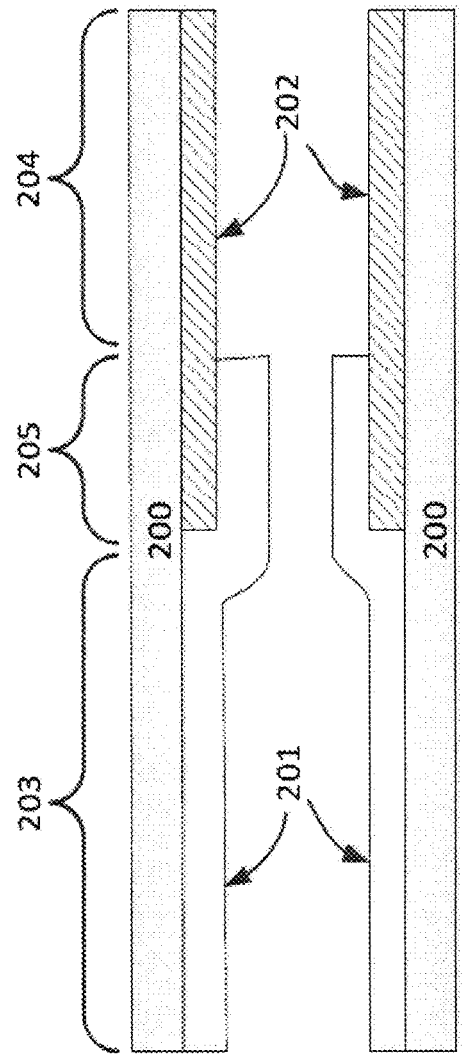

FIGS. 2A, 2B and 2C show some possible coating layer configurations with two coating layers. Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 2A, coating layer 201 extends from the inlet to the outlet about 50% of the substrate length; and coating layer 202 extends from the outlet to the inlet about 50% of the substrate length and the coating layers are adjacent each other, providing an inlet upstream zone 203 and an outlet downstream zone 204. In FIG. 2B, coating layer 202 extends from the outlet about 50% of the substrate length and layer 201 extends from the inlet greater than 50% of the length and overlays a portion of layer 202, providing an upstream zone 203, a middle zone 205 and a downstream zone 204. In FIG. 2C, coating layers 201 and 202 each extend the entire length of the substrate with layer 201 overlaying layer 202. The substrate of FIG. 2C does not contain a zoned coating configuration. FIGS. 2A, 2B and 2C may be useful to illustrate coating compositions on the wall-flow or flow-through substrates as described herein.

Configurations of present coating layers are not limited. For example, the present first sorbent composition, oxidation catalyst composition, and second sorbent composition may each be in a separate coating layer, where the coating layers are in a tone configuration from front to back or are in a configuration from proximal the substrate to distal the substrate or some combination thereof. Alternatively, the functional compositions may be together in one coating layer or in some combination spread over two or three coating layers.

The functional coating, as well as each zone of a functional coating or any section of a coating, is present on the wall-flow filter substrate at a loading (concentration) of, for instance, from about 3.0 g/in$^3$ to about 6.0 g/in$^3$, or from about 3.2 g/in$^3$, about 3.4 g/in$^3$, about 3.6 g/in$^3$, about 3.8 g/in$^3$, about 4.0 g/in$^3$, about 4.2 g/in$^3$ or about 4.4 g/in$^3$ to about 4.6 g/in$^3$, about 4.8 g/in$^3$, about 5.0 g/in$^3$, about 5.2 g/in$^3$, about 5.4 g/in$^3$, about 5.6 g/in$^3$, about 5.8 g/in$^3$, or about 6.0 g/in$^3$ based on the wall-flow substrate. This refers to dry solids weight per volume of the wall-flow substrate. Concentration is based on a cross-section of a substrate or on an entire substrate. The first sorbent composition, oxidation catalyst composition and second sorbent composition are present in the functional coating composition at weight levels, for instance, where any two of the functional compositions have a weight ratio with respect to one another of from about 1:10, about 1:9, about 1:8, about 1:7, about 1:6, about 1:5, about 1:4, about 1:3, about 1:2 or about 1:1 to about 2:1, about 3:1, about 4:1, about 5:1, about 6:1, about 7:1, about 8:1, about 9:1 or about 10:1.

The present functionalized wall-flow filter catalytic article will exhibit excellent backpressure performance, for instance, an increase in backpressure (or pressure drop) of ≤25%, ≤20%, ≤15%, ≤10%, ≤9%, ≤8% or ≤7%, compared to the same article without the functional coating compositions disposed thereon. Pressure drop is measured, for instance, by measuring pressure as a function of air flow, using commercially available equipment such as a SUPERFLOW SF 1020 PROBENCH. Pressure drop may, for example, be measured at an air flow at any point of from 100 cubic feet per minute (cfm) to 375 cfm, for instance at 125, 150, 175, 200, 225, 250, 275, 300, 325 or 350 cfm. Pressure drop may be measured at standard room temperature, ca. 25° C.

In the case of the flow-through monolithic article, the first SCR catalyst composition and the second SCR catalyst composition comprising a molecular sieve comprising a base metal are in adherence to the flow-through monolith substrate, providing the flow-through monolithic article. Configurations of coating layers are not limited. For example, the first SCR catalyst composition and the second SCR catalyst composition may be in separate coating layers or may be combined in a single coating layer, or may be in some combination spread over two coating layers. The first SCR catalyst composition and the second SCR catalyst composition may be zoned and have optional undercoats and/or overcoats as described above for the monolithic wall-flow filter catalytic article. For example, the first SCR catalyst composition and second SCR catalyst composition may each be in a separate coating layer, where the coating layers are in a zone configuration from front to back or are in a configuration from proximal the substrate to distal the substrate or some combination thereof.

Loading of the catalytic coating on a wall-flow substrate will depend on substrate properties such as porosity and wall thickness and typically will be lower than the catalyst loading on a flow-through substrate.

Exhaust Gas Treatment Systems and Methods

The present disclosure further provides an exhaust gas treatment system comprising the monolithic wall-flow filter catalytic article disclosed herein, wherein the monolithic wall-flow filter catalytic article is located downstream of and in fluid communication with an internal combustion engine; the exhaust gas treatment system further comprising a hydrogen injection article, wherein the hydrogen injection article is configured to introduce hydrogen upstream of the monolithic wall-flow filter catalytic article.

In some embodiments, the exhaust gas treatment system further comprises a flow-through monolith catalytic article comprising a substrate, the substrate having a selective catalytic reduction (SCR) coating composition disposed thereon, the SCR coating composition comprising a first SCR catalyst composition, comprising a PGM component dispersed on a refractory metal oxide support; and a second SCR catalyst composition, comprising a molecular sieve comprising a base metal. In some embodiments, the first and second SCR catalyst compositions are layered and/or zoned.

FIG. 3 shows an exemplary exhaust treatment system 303 downstream of and in fluid communication with an internal combustion engine 300. The treatment system 303 comprises a monolithic wall-flow filter catalytic article 301 and a flow-through monolith catalytic article 302, both downstream of and in fluid communication with the internal combustion engine 300. Advantageously, in preferred embodiments, the present treatment system contains only two functional articles, that is the monolithic wall-flow filter catalytic article 301 and the flow-through monolith catalytic article 302.

The present treatment system may also contain an article suitable to inject ammonia upstream of the flow-through monolith catalytic article 302. A urea or an ammonia injection article will be in fluid communication with the treatment system and may comprise reservoirs, pumps, spray nozzles, valves, mixing boxes, etc. Urea is converted to ammonia which serves as the reductant in the SCR flow-through monolith catalytic article 302. Alternatively, ammonia is introduced directly. Other articles not shown may include reservoirs, pumps, spray nozzles, etc.

The exhaust gas treatment systems may comprise a hydrogen injection article configured to introduce hydrogen upstream of the monolithic wall-flow filter catalytic article 301. For example, the hydrogen injection article may be configured for intermittent introduction of stored hydrogen. The hydrogen injection article may be configured to introduce stored hydrogen during a cold-start period. Hydrogen may be brought on-board in a hydrogen storage article, or may be generated on-board from water-splitting or from ammonia decomposition.

Advantages of the present monolithic wall-flow filter catalytic article and integrated system comprising it include a lower space requirement for the article and integrated system and good backpressure performance. For example, in some embodiments, the present exhaust treatment system will result in an increase in backpressure (or pressure drop)

of ≤25%, ≤20%, ≤15%, ≤10%, ≤9%, ≤8% or ≤7%, compared to the same system without the functional coating compositions disposed thereon. Pressure drop is measured, for instance, by measuring pressure as a function of air flow, using commercially available equipment such as a SUPERFLOW SF 1020 PROBENCH. Pressure drop may for example be measured at an air flow at any point of from 100 cubic feet per minute (cfm) to 375 cfm, for instance at 125, 150, 175, 200, 225, 250, 275, 300, 325 or 350 cfm. Pressure drop may be measured at standard room temperature, ca. 25° C.

Further, as the monolithic wall-flow filter catalytic article may be located close to an engine, and the catalyst composition may produce sufficient levels of $NO_2$, an active regeneration procedure may serve as a backup, as a continuously passive regeneration process may be sufficient. The HC (SOF) and carbon (soot) can react with $NO_2$ at temperatures as low as from about 350° C. to about 400° C. In a present method, no active regeneration may be necessary (saving fuel).

Another aspect of the present invention is a method for treating an exhaust gas stream containing $NO_x$ and/or CO and/or HC and/or soot, comprising receiving the exhaust stream into the present wall-flow monolithic article or the exhaust gas treatment system as disclosed herein.

In the present exhaust gas treatment methods, the exhaust gas stream is received into the monolithic wall-flow filter catalytic article or integrated system by entering the upstream end and exiting the downstream end of the article or system. The inlet end of an article or system is synonymous with the "upstream" end or "front" end. The outlet end is synonymous with the "downstream" end or "rear" end. In some embodiments, hydrogen is introduced upstream from the monolithic wall-flow filter catalytic article, the flow-through monolith catalytic article, or both. In some embodiments, ammonia or urea is introduced upstream or the flow-through monolith catalytic article.

Present articles, systems and methods are suitable for treatment of exhaust gas streams from mobile emissions sources such as trucks and automobiles. Articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in alt variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

Monolithic Wall-Flow Filter Catalytic Article

A bottom coat catalyst composition slurry containing milled alumina powder impregnated with Pd (0.5 wt. %), Ba (0.8 wt. %) and Pt (0.3 wt. %) was prepared and adjusted to a pH of 4.5 to 5.0 with nitric acid. The bottom coat slurry had a solid content of 38 wt. %. The bottom coat slurry was applied to the entire core length of a 1"×3", 200 cpsi (cells per square inch) and 12 mil wall thickness honeycomb substrate filter with alternate channel openings, via a washcoat technique. The bottom coat slurry was applied to the outlet channels only. The coated substrate was air dried at 120° C. and calcined at 500° C. for 1 hour, providing a coating loading of 1.6 g/in$^3$.

A top coat slurry containing alumina/5 wt. % Mn and Pt-amine (2.8 wt. %) was prepared, milled and adjusted to a pH of 4.5 to 5.0 with nitric acid. The top coat slurry had a solid concentration of 37 wt. %. Zeolite beta (0.35 g/in$^3$) was added to the top coat slurry. The top coat slurry was applied to the entire core length of the same honeycomb substrate, and was applied to the inlet channels only. The coated substrate was dried and calcined as the bottom coat, to provide a total coating loading of 2.5 g/in$^3$ and a Pt/Pd weight ratio of 2/1.

Example 2

Flow-Through Monolith Catalytic Article

An SCR catalyst composition slurry containing milled CuCHA (3.7 wt. % Cu) and 5 wt. % zirconium acetate binder was prepared and applied via a washcoat technique to a 400 cpsi, 1"×5.5" honeycomb substrate having a volume of 70.8 cm$^3$. The coated core was dried at 130° C. and calcined at 550° C. for 1 hour to provide a coating loading of 2.75 g/in$^3$.

Example 3

Exhaust Gas Treatment

Figure 4:
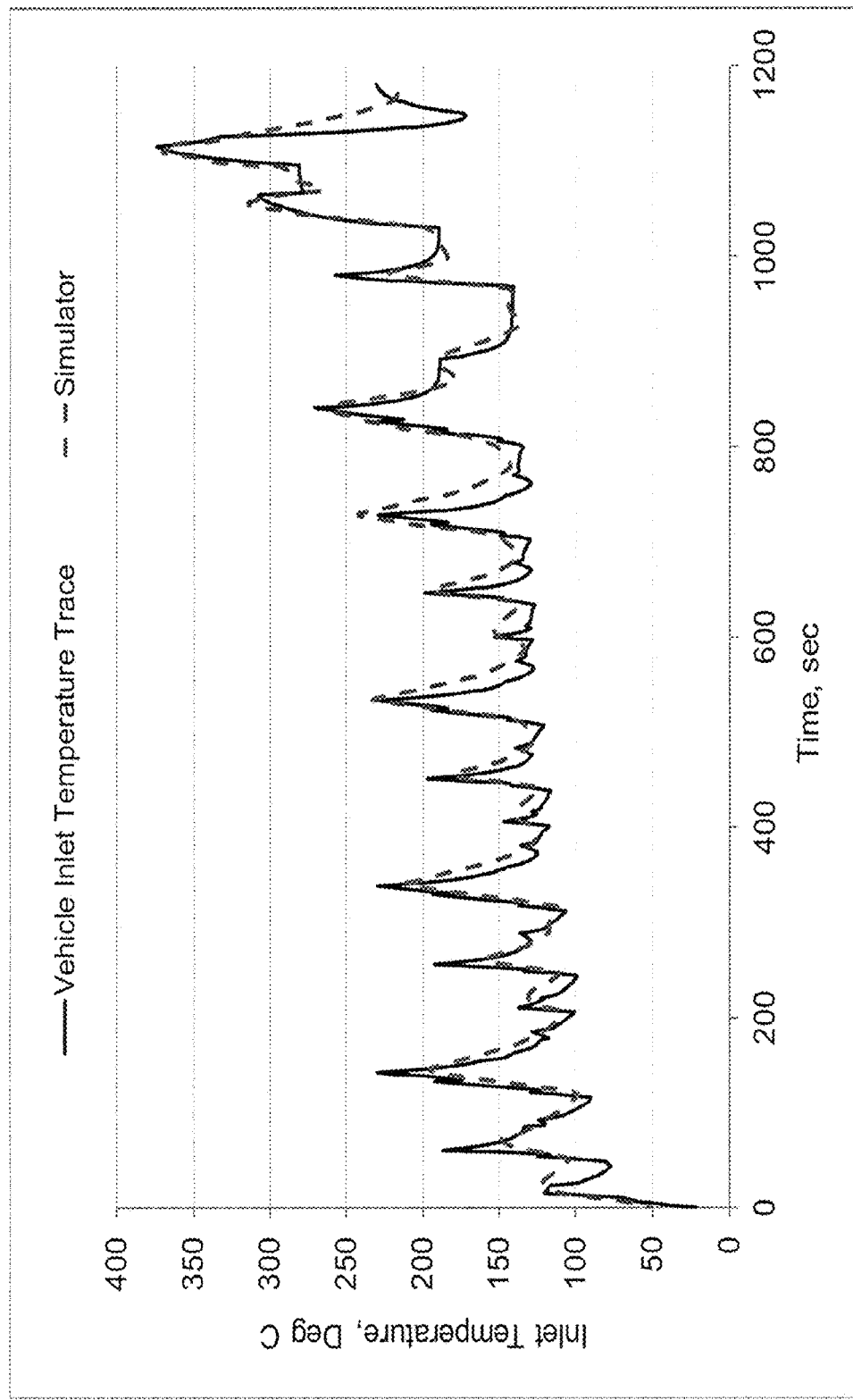
FIG. 4 is a graphical indicating the simulated exhaust gas flow conditions of an engine out exhaust gas for the NEDC cycle.

The coated monolithic wall-flow filter catalytic article (Example 1) was hydrothermally aged in a tube furnace at 800° C. for 16 hours with a feed gas composition of 10% $H_2O$, 10% $O_2$, balance $N_2$. The flow-through monolith catalytic article (Example 2) was fresh. Samples were evaluated in a lab reactor equipped to conduct a simulated NEDC (New European Driving Cycle) with a separate feed line for $H_2/N_2$ serving as the source for H pulse, just in front of the coated monolithic wall-flow filter catalytic article (Example 1). The simulated exhaust gas flow conditions, and the feed compositions of an engine out exhaust gas for the NEDC cycle, are represented in FIG. 4, while FIG. 5 provides a graphical comparison of engine out CO emissions between the vehicle trace and simulator.

Hydrogen injection impact was evaluated for Example 1 only and for the coated monolithic wall-flow filter catalytic article+SCR composition-coated flow-through monolith catalytic article combination system, with a sampling line present between the Example 1 and Example 2 articles, as well as a second sampling line after the combined system. The Example 2 article was downstream of the Example 1 article.

Hydrogen was pulsed into the exhaust stream during the first 200 or 300 seconds with a hydrogen concentration in a feed gas of 1%. Hydrogen injection was performed via a separate (non-preheated) line in a $H_2/N_2$ feed gas. The first 200 or 300 seconds were representative of a cold-start period.

Results for % conversion of CO, HC and $NO_x$ on the combined system were obtained as follows:

|  |  | CO | HC | $NO_x$ |
|---|---|---|---|---|
|  | no $H_2$ | 47 | 61 | 62 |
| 0-200 sec | 1% $H_2$ | 61 | 68 | 66 |
| 0-300 sec | 1% $H_2$ | 71 | 74 | 69 |

The data obtained demonstrated that small amounts of hydrogen provided significant improvements in CO/HC/$NO_x$ conversions for a combined functional composition-coated monolithic wall-flow filter catalytic article/flow-through monolith catalytic article system as described herein.

What is claimed is:

1. A monolithic wall-flow filter catalytic article comprising:
   a substrate having an axial length L, a diameter D, and a volume, wherein the substrate comprises a front, upstream end and a rear, downstream end defining the axial length, an aspect ratio defined by L/D of from about 1 to about 20; and
   a functional coating composition disposed on the substrate, the functional coating composition comprising a first sorbent composition, an oxidation catalyst composition, and optionally, a second sorbent composition, wherein the first sorbent composition comprises a zeolite selected from the group consisting of faujasite, chabazite, clinoptilolite, mordenite, silicalite, zeolite X, zeolite Y, ultrastable zeolite Y, ZSM-5 zeolite, offretite and beta zeolite.

2. The monolithic wall-flow filter catalytic article of claim 1, wherein the first sorbent composition further comprises one or more of alkaline earth metal oxides, alkaline earth metal carbonates, or rare earth oxides.

3. The monolithic wall-flow filter catalytic article of claim 1, wherein the oxidation catalyst composition effectively oxidizes one or more of NO, CO, and HC in an exhaust gas stream at a temperature of less than about 150° C.

4. The monolithic wall-flow filter catalytic article of claim 1, wherein the oxidation catalyst composition comprises a platinum group metal (PGM) component dispersed on a refractory metal oxide support.

5. The monolithic wall-flow filter catalytic article of claim 1, wherein the second sorbent composition comprises a small pore or medium pore molecular sieve and, optionally, a PGM component.

6. The monolithic wall-flow filter catalytic article of claim 1, wherein the first sorbent composition, the oxidation catalyst composition, and, optionally, the second sorbent composition are arranged in two or three layers in a zoned configuration.

7. The monolithic wall-flow filter catalytic article of claim 1, wherein the monolithic wall-flow filter catalytic article exhibits an increase in backpressure or a pressure drop, measured as a function of air flow, of ≤25% relative to a monolithic wall-flow filter article of the same substrate and dimensions without the functional coating composition disposed thereon.

8. A vehicle comprising the monolithic wall-flow filter catalytic article of claim 1.

9. An exhaust gas treatment system comprising:
   a monolithic wall-flow filter catalytic article located downstream of and in fluid communication with an internal combustion engine; and
   a first hydrogen injection article, wherein the first hydrogen injection article is configured to introduce hydrogen upstream of the monolithic wall-flow filter catalytic article;
   wherein the monolithic wall-flow filter catalytic article comprises:
   a substrate having an axial length L, a diameter D, and a volume, wherein the substrate comprises a front, upstream end and a rear, downstream end defining the axial length, an aspect ratio defined by L/D of from about 1 to about 20; and
   a functional coating composition disposed on the substrate, the functional coating composition comprising a first sorbent composition, an oxidation catalyst composition, and optionally, a second sorbent composition.

10. The exhaust gas treatment system of claim 9, further comprising a hydrogen storage article, wherein the hydrogen injection article is configured for intermittent introduction of hydrogen stored in the hydrogen storage article.

11. The exhaust gas treatment system of claim 9, further comprising a flow-through monolith catalytic article downstream of and in fluid communication with the monolithic wall-flow filter catalytic article, the flow-through monolith catalytic article comprising a substrate having a selective catalytic reduction (SCR) coating composition disposed thereon, the SCR coating composition comprising:
   a first SCR catalyst composition, comprising a PGM component dispersed on a refractory metal oxide support; and
   a second SCR catalyst composition, comprising a molecular sieve comprising a base metal.

12. The exhaust gas treatment system of claim 11, wherein the first SCR catalyst composition is effective in reducing nitrogen oxides ($NO_x$) at a temperature of <250° C.

13. The exhaust gas treatment system of claim 11, wherein the second SCR catalyst composition is effective in reducing $NO_x$ at a temperature of from about 250° C. to about 550° C.

14. The exhaust gas treatment system of claim 11, wherein the molecular sieve is an aluminosilicate zeolite having a CHA crystal structure and a silica-to-alumina ratio from about 1 to about 1000.

15. The exhaust gas treatment system of claim 11, wherein the SCR coating composition comprises:
   a first SCR coating layer comprising the first SCR catalyst composition; and
   a second SCR coating layer comprising the second SCR catalyst composition.

16. The exhaust gas treatment system of claim 15, wherein the first SCR coating layer and the second SCR coating layer are in a zoned configuration.

17. The exhaust gas treatment system of claim 11, further comprising a second hydrogen injection article configured to introduce hydrogen upstream of the flow-through monolith article.

18. The exhaust gas treatment system of claim 11, further comprising a hydrogen storage article, wherein the second hydrogen injection article is configured for intermittent introduction of hydrogen stored in the hydrogen storage article.

19. The exhaust gas treatment system of claim 11, further comprising a urea injector upstream of and in fluid communication with the flow-through monolith article.

20. The exhaust gas treatment system of claim 11, further comprising an ammonia injector in fluid communication with and configured to introduce ammonia upstream of the monolithic wall-flow filter catalytic article.

21. The exhaust gas treatment system of claim 11, wherein the exhaust gas treatment system exhibits an increase in backpressure or a pressure drop, measured as a function of air flow, of ≤25% relative to an exhaust gas treatment system having the same construction and configuration without the functional coating compositions disposed thereon.

22. The exhaust gas treatment system of claim 9, wherein the first sorbent composition comprises one or more of alkaline earth metal oxides, alkaline earth metal carbonates, rare earth oxides.

23. The exhaust gas treatment system of claim 9, wherein the first sorbent composition comprises a zeolite selected from the group consisting of faujasite, chabazite, clinoptilolite, mordenite, silicalite, zeolite X, zeolite Y, ultrastable zeolite Y, ZSM-5 zeolite, offretite and beta zeolite.

24. The exhaust gas treatment system of claim 9, wherein the second sorbent composition comprises a small pore or medium pore molecular sieve and, optionally, a PGM component.

25. An exhaust gas treatment system comprising:
- a monolithic wall-flow filter catalytic article comprising a substrate having an axial length L, a diameter D, and a volume, wherein the substrate comprises a front, upstream end and a rear, downstream end defining the axial length and an aspect ratio defined by L/D of from about 1 to about 20;
- the substrate having a functional coating composition disposed thereon, the functional coating composition comprising a first sorbent composition; an oxidation catalyst composition, and optionally, a second sorbent composition; and
- a flow-through monolith catalytic article downstream of and in fluid communication with the monolithic wall-flow filter catalytic article, the flow-through monolith catalytic article comprising a substrate having a selective catalytic reduction (SCR) coating composition disposed thereon, the SCR coating composition comprising a first SCR catalyst composition and a second SCR catalyst composition, wherein the second SCR catalyst composition comprises a molecular sieve comprising a base metal.

26. The exhaust gas treatment system of claim 25, further comprising a hydrogen injection article configured to introduce hydrogen upstream of the flow-through monolith article.

27. The exhaust gas treatment system of any of claim 26, further comprising a hydrogen storage article, wherein the hydrogen injection article is configured for intermittent introduction of hydrogen stored in the hydrogen storage article.

28. A vehicle comprising the exhaust gas treatment system of claim 9.

29. A method for treating an exhaust stream containing $NO_x$ and/or CO and/or HC and/or soot, the method comprising receiving the exhaust stream into the monolithic wall-flow filter catalytic article of claim 1.

30. A method for treating an exhaust stream containing $NO_x$ and/or CO and/or HC and/or soot, the method comprising receiving the exhaust stream into the exhaust gas treatment system of claim 9.

* * * * *

UNITED STATES PATENT AND TRADEMARK OFFICE
CERTIFICATE OF CORRECTION

| | | |
|---|---|---|
| PATENT NO. | : 11,199,117 B2 | Page 1 of 1 |
| APPLICATION NO. | : 16/591822 | |
| DATED | : December 14, 2021 | |
| INVENTOR(S) | : Sung et al. | |

It is certified that error appears in the above-identified patent and that said Letters Patent is hereby corrected as shown below:

In the Claims

In Claim 22, Column 35, Lines 19-20, "carbonates, rare earth oxides." should read --carbonates, or rare earth oxides.--.

In Claim 27, Column 36, Line 20, "system of any of claim 26," should read --system of claim 26,--.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*